Sept. 5, 1950 W. B. COOPER ET AL 2,521,044
APPARATUS FOR ANNEALING
Original Filed April 6, 1940 13 Sheets-Sheet 1

Inventors:
William B. Cooper,
Edward J. Seabold,
By Cushman Darby & Cushman
Attorneys Sept. 5, 1950 W. B. COOPER ET AL 2,521,044
APPARATUS FOR ANNEALING
Original Filed April 6, 1940 13 Sheets-Sheet 2

Inventors:
William B. Cooper,
Edward J. Seabold,
By Cushman Darby & Cushman
Attorneys Sept. 5, 1950     W. B. COOPER ET AL     2,521,044
APPARATUS FOR ANNEALING Original Filed April 6, 1940     13 Sheets-Sheet 3

Inventors:
William B. Cooper,
Edward J. Seabold,
By Cushman Darby Cushman
Attorneys Sept. 5, 1950     W. B. COOPER ET AL     2,521,044
APPARATUS FOR ANNEALING
Original Filed April 6, 1940     13 Sheets-Sheet 4
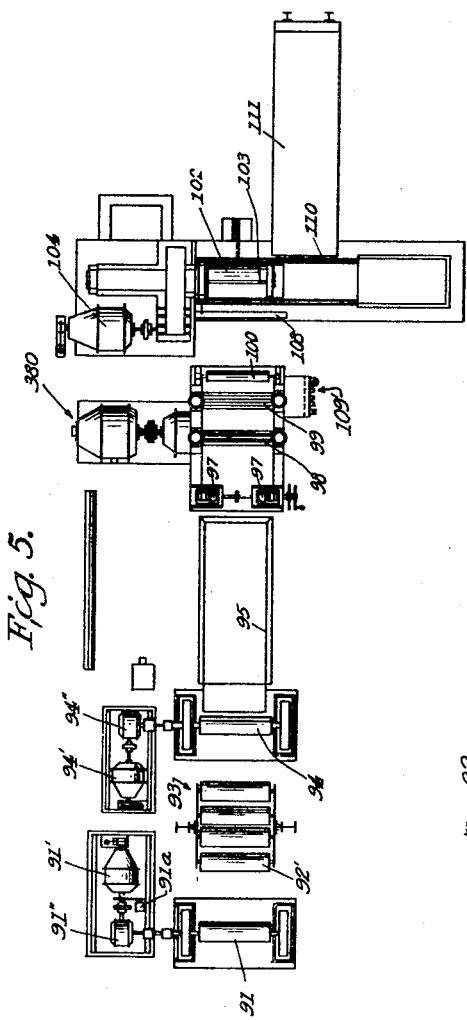
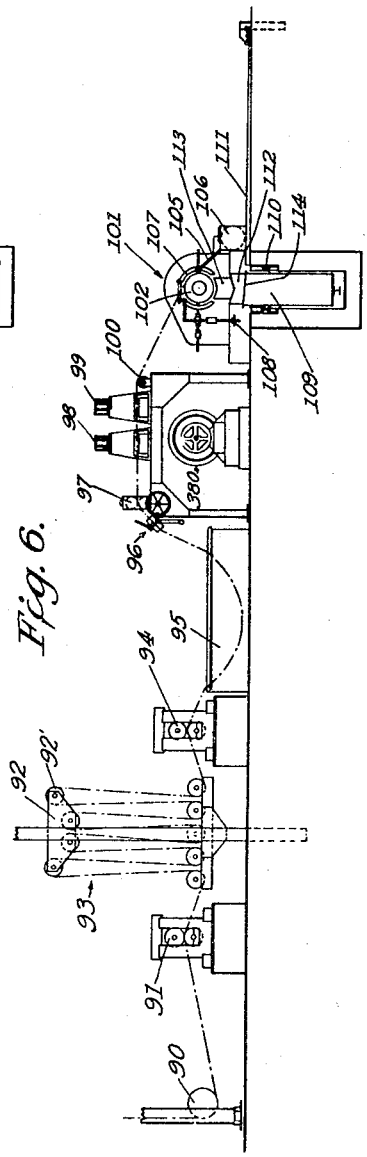
Inventors:
William B. Cooper,
Edward J. Seabold,
Attorneys

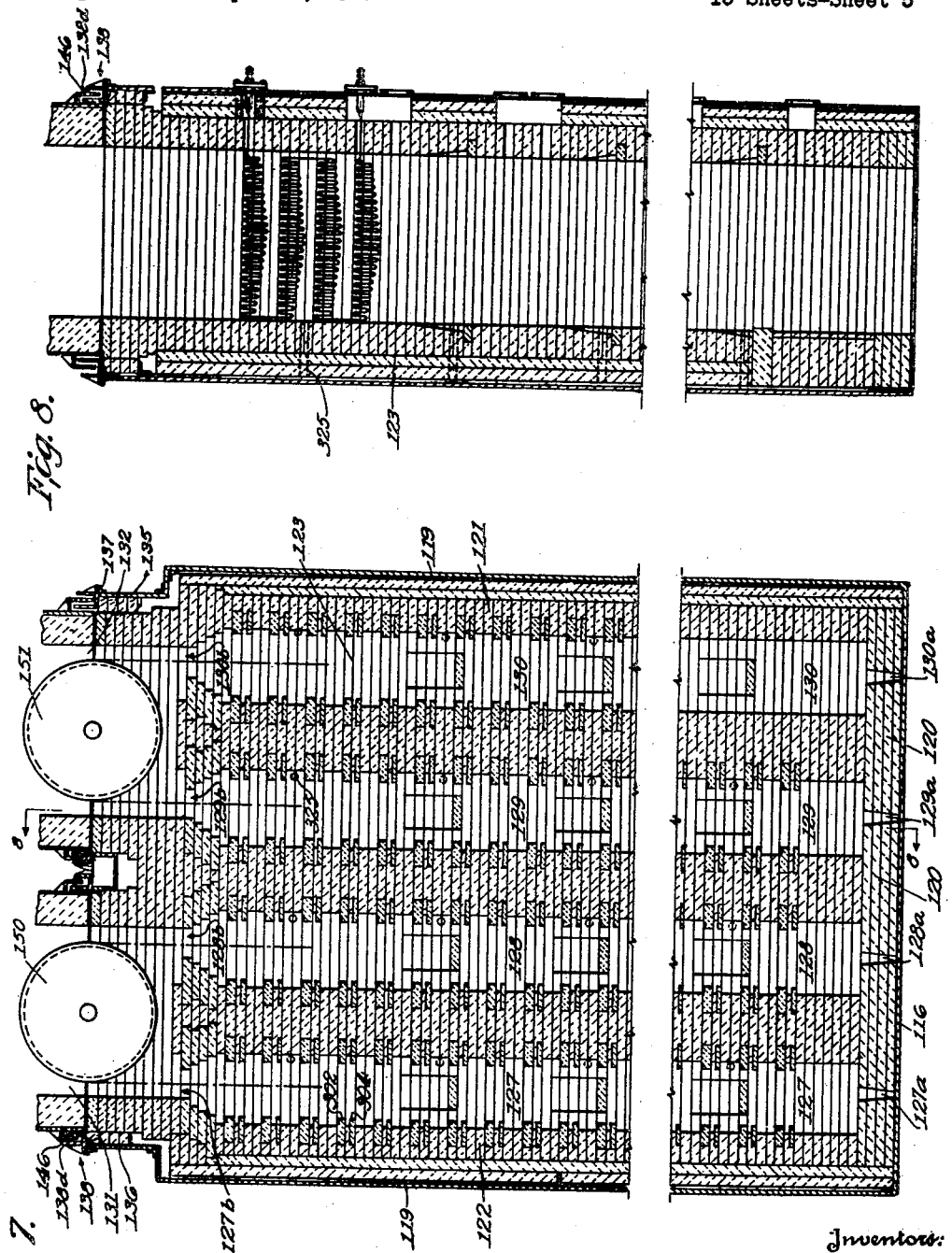

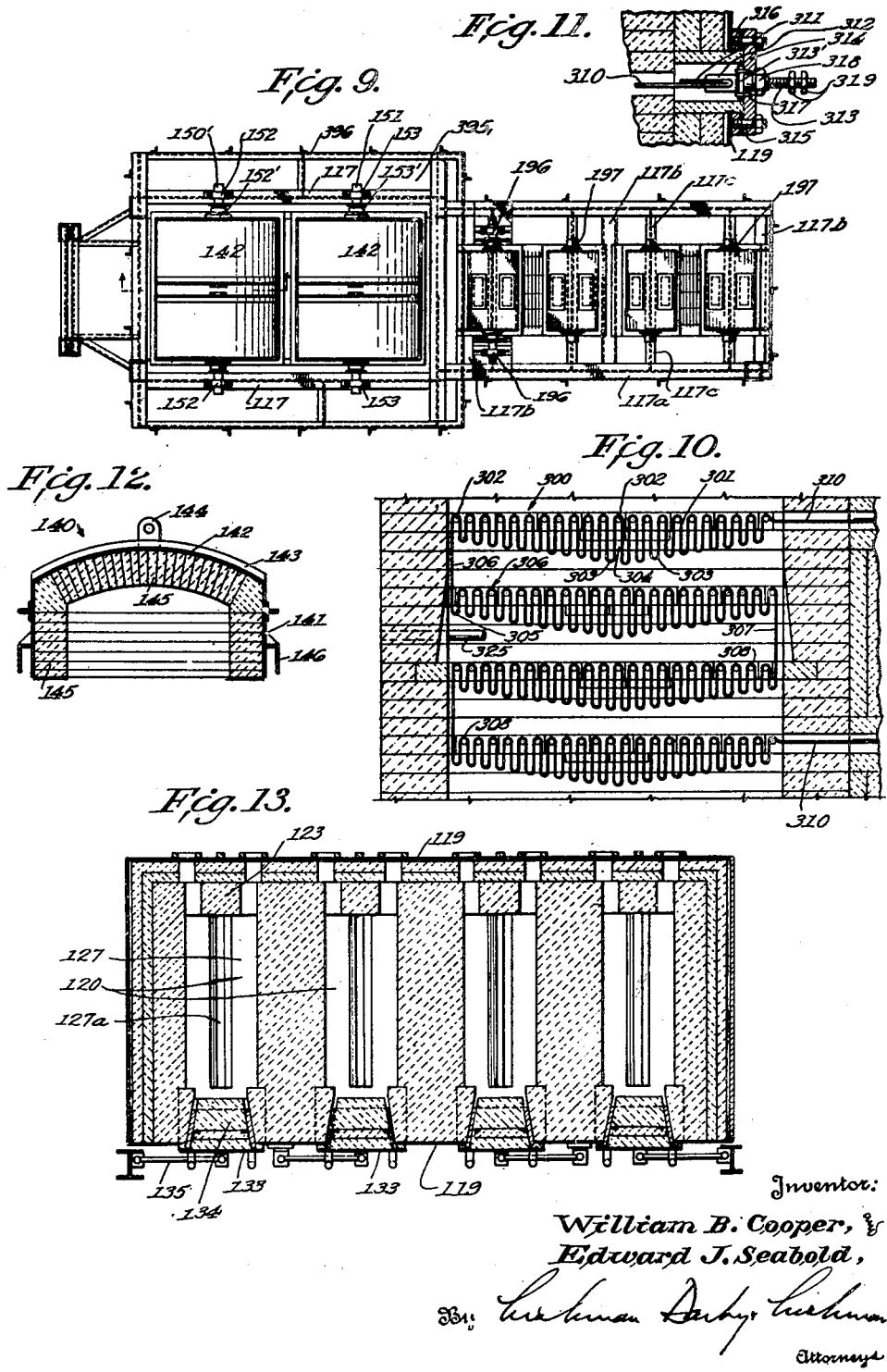

Sept. 5, 1950 W. B. COOPER ET AL 2,521,044
APPARATUS FOR ANNEALING
Original Filed April 6, 1940 13 Sheets-Sheet 7
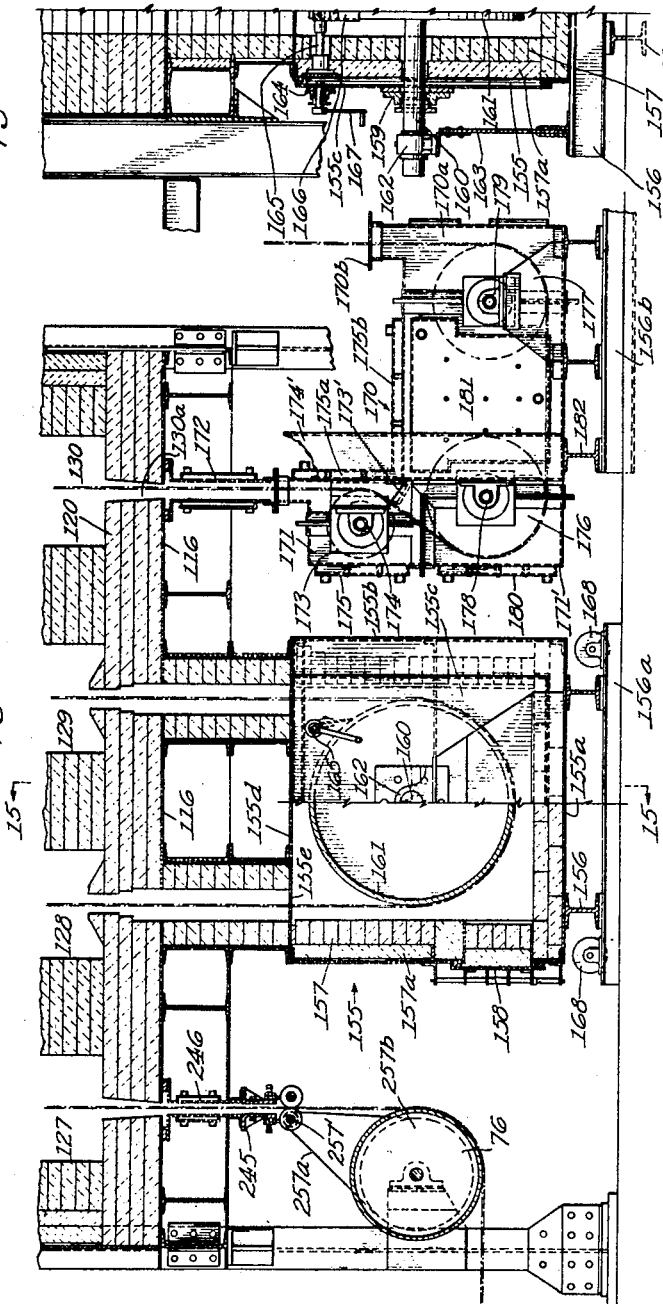
Inventors:
William B. Cooper,
Edward J. Seabold,
By Cushman Darby Cushman
Attorneys Sept. 5, 1950  W. B. COOPER ET AL  2,521,044
APPARATUS FOR ANNEALING
Original Filed April 6, 1940  13 Sheets-Sheet 8
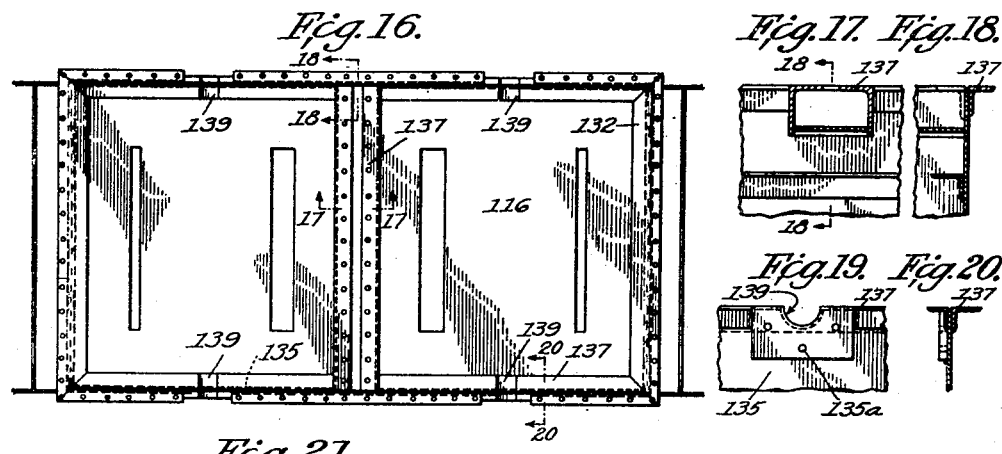
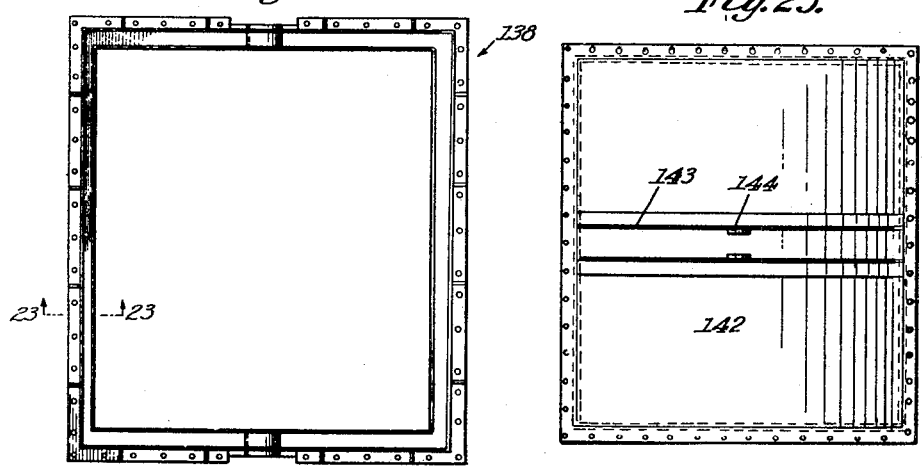
Inventors:
William B. Cooper, &
Edward J. Seabold, Sept. 5, 1950   W. B. COOPER ET AL   2,521,044
APPARATUS FOR ANNEALING
Original Filed April 6, 1940   13 Sheets-Sheet 9
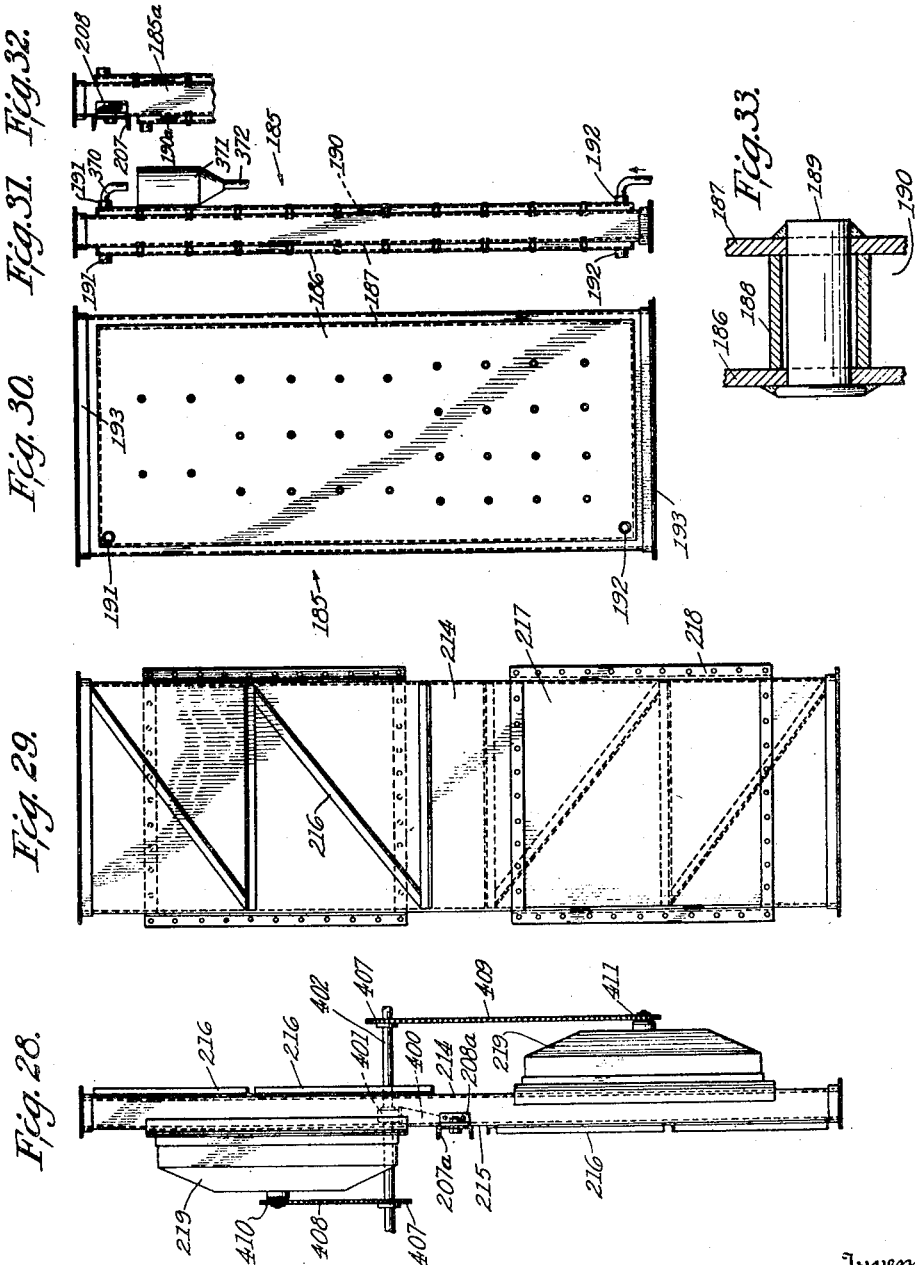
Inventors:
William B. Cooper, &
Edward J. Seabold,
By Cushman Darby Cushman
Attorneys Sept. 5, 1950 W. B. COOPER ET AL 2,521,044
APPARATUS FOR ANNEALING
Original Filed April 6, 1940 13 Sheets-Sheet 11
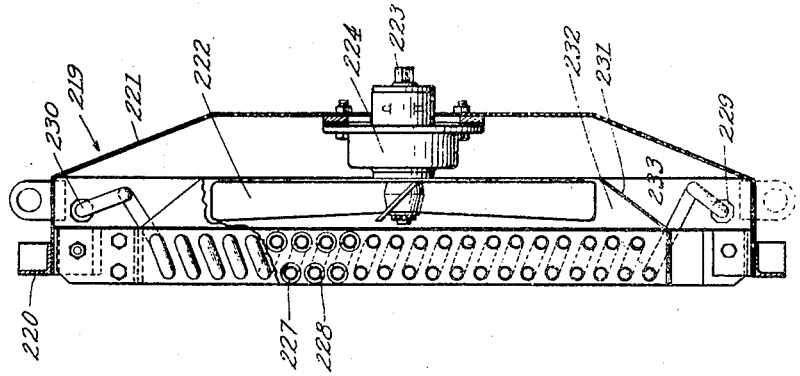
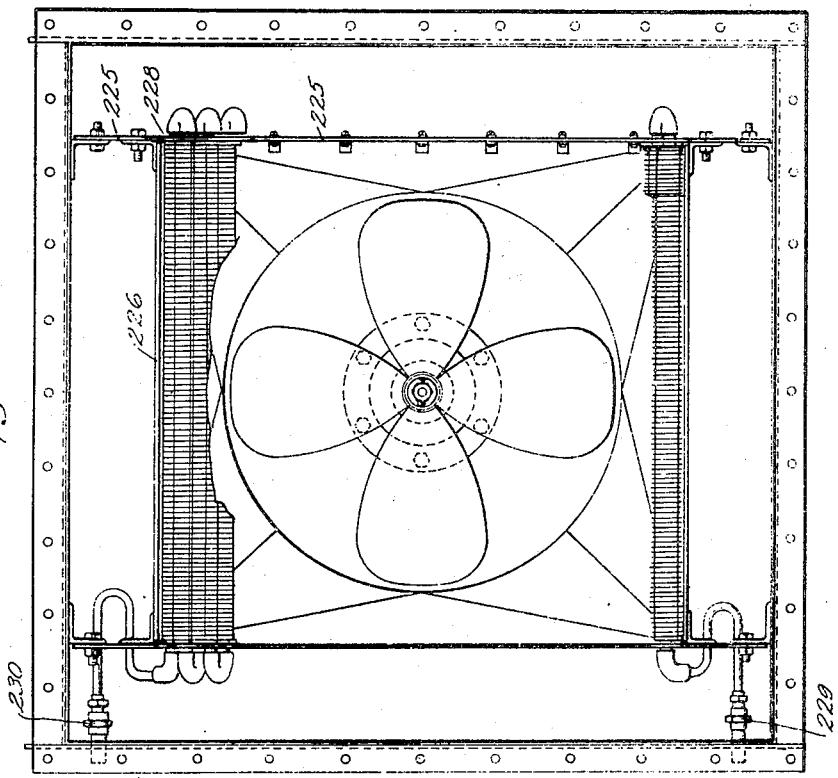
Inventors:
William B. Cooper, &
Edward J. Seabold,
By Cushman Darby & Cushman
Attorneys Sept. 5, 1950  W. B. COOPER ET AL  2,521,044
APPARATUS FOR ANNEALING Original Filed April 6, 1940  13 Sheets-Sheet 12

Inventors:
William B. Cooper,
Edward J. Seabold,
Attorneys

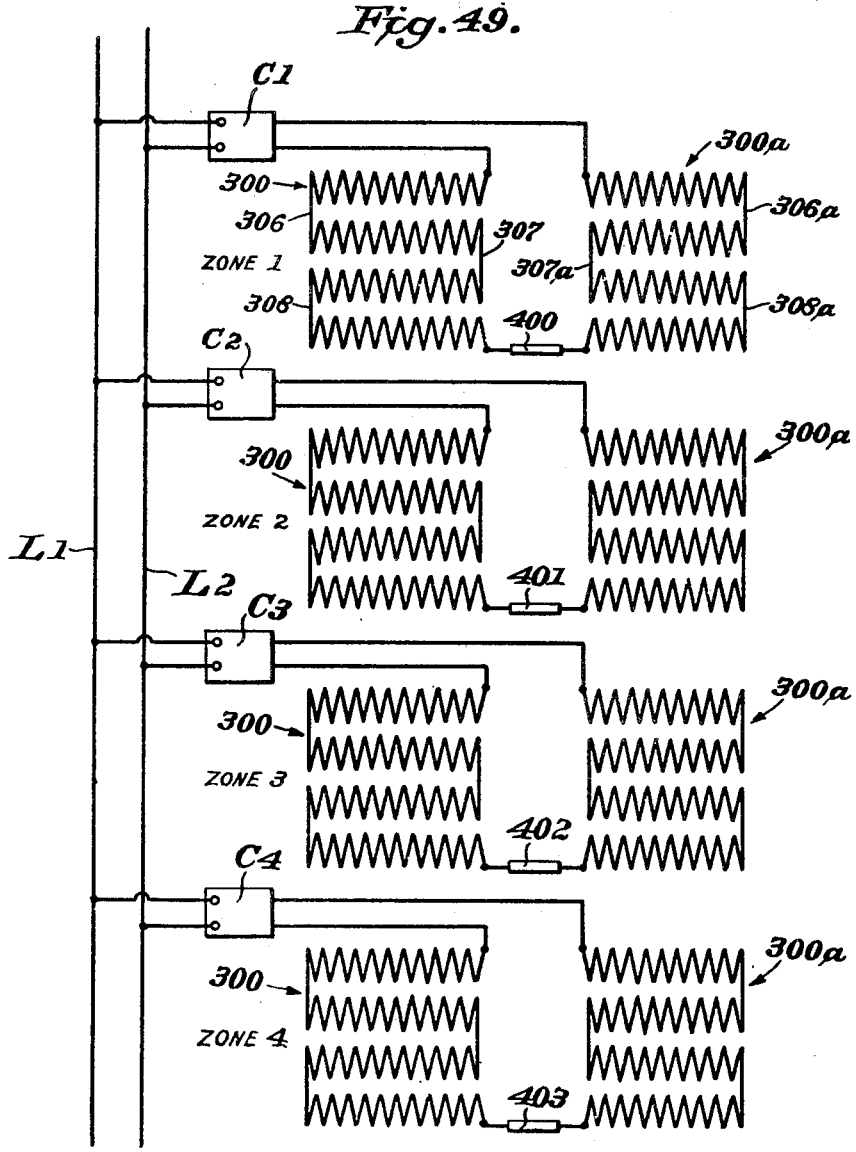

Patented Sept. 5, 1950

2,521,044

UNITED STATES PATENT OFFICE 2,521,044

APPARATUS FOR ANNEALING

William B. Cooper and Edward J. Seabold, Baltimore, Md., assignors to Crown Cork & Seal Company, Inc., Baltimore, Md., a corporation of New York Original application April 6, 1940, Serial No. 328,292. Divided and this application August 5, 1943, Serial No. 497,524

8 Claims. (Cl. 263—3)

This is a division of our application which matured into Patent 2,345,181 on March 28, 1944.

The present invention relates to a method of and apparatus for continuously handling and annealing strip steel.

More particularly, the invention is concerned with means for and methods of continuously bright-annealing low carbon, cold rolled strip steel.

It is an object of the invention to provide an improved continuous annealing method to take the place of conventional batch annealing processes, thereby to improve the quality and uniformity of the anneal, as well as to shorten the annealing time and reduce its cost.

It is a further object to increase the tonnage of strip steel that may be annealed in a given length of time with an apparatus occupying a particular area of plant space.

It is a further object of the invention to reduce greatly the cost of annealing strip steel, by materially reducing the heating costs, the handling costs and other labor charges.

It is a further object of the invention to produce in the strip steel an improved anneal, characterized by small, uniform grain structure, resulting from the use of high annealing temperatures followed by rapid cooling from the critical temperature to substantially room temperature. In accordance with the invention, the material is maintained at a high annealing temperature for a sufficient period of time to permit the crystalline grains to lose the orientation and elongated shape acquired in cold rolling, and to assume the random positions characteristic of well-annealed steel, but the steel is cooled with sufficient speed to prevent the formation of large grains of ferrite, which is a characteristic result of the long cooling periods used in batch annealing.

It is a further object of the invention to provide novel, improved means for accurately and uniformly controlling the temperature to which the strip is raised during its treatment, the time during which the strip is held or "soaked" at a high temperature, and the time, rate and degree of cooling.

It is a further object of the invention to provide novel means for preventing or controlling oxidation of the strip during the annealing process, whereby a bright-annealed strip or a strip having desired, controlled color characteristics, may be produced.

One of the principal objects and advantages of the present invention is the elimination, in a continuous annealing method, of fluctuations in the temperature to which the strip is subjected, whereby inequalities in the ductility and hardness of the annealed strip are eliminated. Thus, the invention includes novel methods of maintaining the heating means and the strip passing through particular zones of the furnace at desired constant temperatures.

A further important object of the invention is to provide novel means for maintaining the temperature in the strip, transversely thereof substantially uniform, so as to produce a strip that is uniformly annealed transversely thereof, characterized by the absence of burned or overly-heated edge portions or insufficiently heated central portions.

It is a further object of the invention to provide novel methods of controlling the hardness and ductility of the annealed strip, by controlling and varying the temperature in the soaking zone and the cooling rate.

A further object of the invention is to provide novel means for and methods of handling strip steel and delivering the same continuously to the annealing furnace, and for handling and reeling the annealed strip as it is discharged from the furnace. To this end, the invention contemplates providing a reserve supply of strip steel from which the material may be continuously delivered to the furnace while the trailing end of one supply reel is welded to the leading end of the next, so that no interruption in the delivery of strip to the furnace need occur. The invention also may include novel means for cleaning the strip before it is introduced into the furnace. Cold rolled strip steel, as it comes from the rolling mill, has on its surfaces a coating of palm oil or the like which, preferably, is removed before introduction of the strip into the furnace. The invention includes novel means for performing this function continuously as the strip is delivered to the furnace.

A further advantage of the preferred arrangement of strip handling material is that, if desired, the annealing furnace may be by-passed and the strip drawn through the cleaning apparatus and the reeling machines directly to the reeling device, so that, in the event of a shutdown of the furnace for maintenance or repairs, the cleaning apparatus may be utilized, the strip rolled up into the usual coils and the latter annealed in a batch annealing furnace or the like.

It is a further object to provide, on the discharge side of the furnace, novel strip handling instrumentalities whereby, when a predetermined amount of metal has been wound up on an expansible and contractible mandrel in the form of a reel or coil, the strip may be cut, the coil removed and the winding of a new coil started, all without interrupting the delivery of strip continuously from the furnace.

Other objects and advantages of the invention will be apparent from a consideration of the following description of certain specific embodiments of the invention shown in the accompanying drawings.

In the drawings:

Figure 5 is a diagrammatic plan view of a preferred arrangement of strip handling instrumentalities on the delivery side of the annealing apparatus.

Figure 6 is a side elevation of the mechanisms shown in Figure 5.

Figure 7 is a vertical sectional view of the heating section of the annealing furnace of Figure 4, on a somewhat enlarged scale, with certain parts removed and other parts broken away.

Figure 8 is a transverse sectional view taken on line 8—8 of Figure 7.

Figure 9 is a top plan view of the apparatus of Figure 4, with certain parts removed.

Figure 10 is an enlarged fragmentary vertical section through one of the heating chambers showing a preferred arrangement of heating elements.

Figure 11 is a sectional detail, showing a preferred terminal arrangement.

Figure 12 is a vertical sectional view of one of the caps or hoods for closing the upper end of one of the heating chambers.

Figure 13 is a horizontal sectional view showing the furnace floor in plan.

Figure 14 is a side view, on an enlarged scale, partly in section and partly in elevation, showing the lower end of the furnace structure and strip guiding means.

Figure 15 is a fragmentary vertical section taken on line 15—15 of Figure 14.

Figure 16 is a plan view of the furnace casing, with the brickwork, guiding rolls and closure hoods removed.

Figures 17, 18, 19 and 20 are sectional details, taken on corresponding section lines on Figure 16.

Figure 21 is a plan view of a channel-forming frame member or collar adapted to be mounted at the upper ends of the side walls of the furnace casing.

Figure 22 is an end elevation of the member shown in Figure 21, while Figures 23 and 24 are sections on corresponding section lines on Figures 21, 22.

Figure 25 is a plan view of the hood or cap shown in Figure 12, while Figures 26 and 27 are an elevation and a vertical section, the latter being taken on line 27—27 of Figure 26.

Figure 28 is an end elevation of one type of cooling chute section.

Figure 29 is a side elevation taken from the right of Figure 28, with certain parts removed.

Figure 30 is a side elevation of a water-jacketed cooling chute section.

Figure 31 is an end elevation of the chute section shown in Figure 30.

Figure 32 is a fragmentary end elevation of a modified form of chute.

Figure 33 is a sectional view of a detail, on an enlarged scale.

Figures 34, 35 and 36 are end and side elevational views of still another type of cooling chute section, while

Figure 38 is a vertical sectional view through a strip discharge assembly adapted to be associated with the last cooling chute section.

Figure 39 is a side elevation of the assembly shown in Figure 38, while

Figure 41 is an elevational view on an enlarged scale of one of the cooling units adapted to be associated with the chute section shown in Figure 28.

Figure 42 is a transverse section through the apparatus of Figure 41.

Figure 47 is a side elevation of the same, while Figure 49 is a circuit diagram of the heating elements in one of the heating sections of the annealing furnace.

Figure 1:
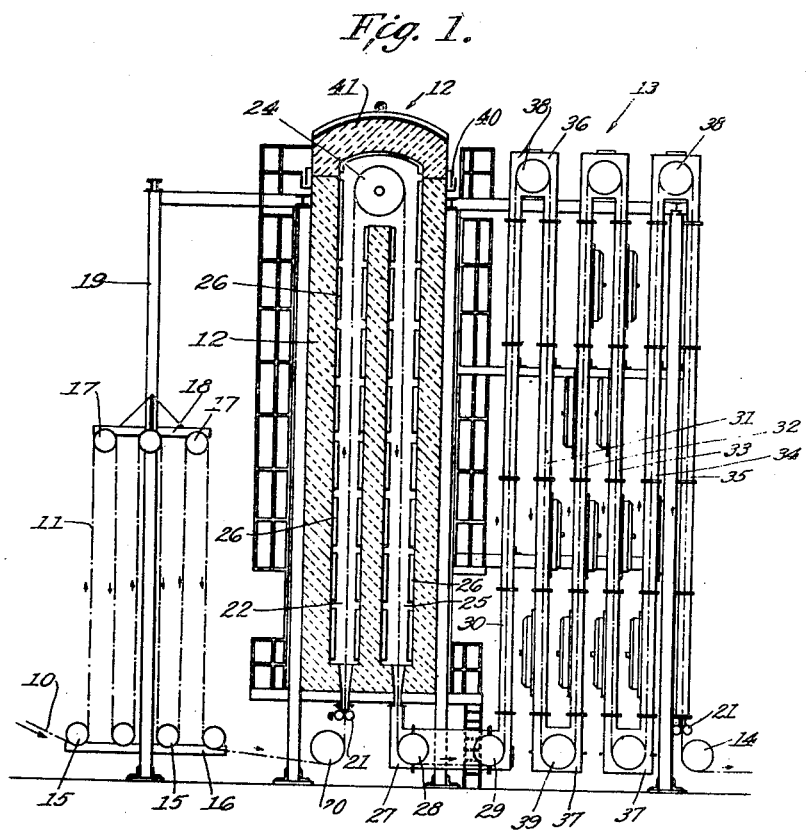
Figure 1 is a diagrammatic side elevation of one form of annealing apparatus.

In Figure 1, there is shown a diagrammatic view of a simple form of apparatus constructed in accordance with the invention. Strip steel 10 is drawn from any suitable source of supply through a looper 11, a furnace 12 and a cooling apparatus 13, and then under a delivery roll 14 to a suitable reeling device or the like. As pointed out below, the strip 10 may come from the instrumentalities shown in Figures 2 and 3, and may be delivered from the furnace to the devices shown in Figures 5 and 6, but the invention, in its broadest aspects, is not limited to the use of these particular mechanisms, as equivalents may be substituted.

Figure 43:
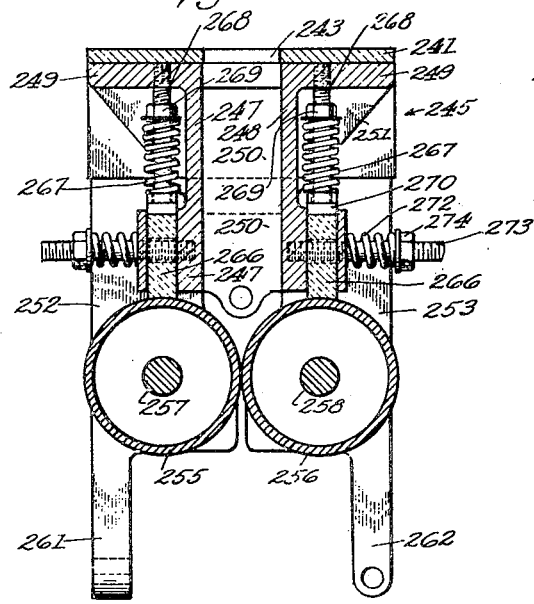
Figure 43 is a vertical sectional view of a gas-tight roll seal through which the strip passes to or from the annealing apparatus.
Figure 44:
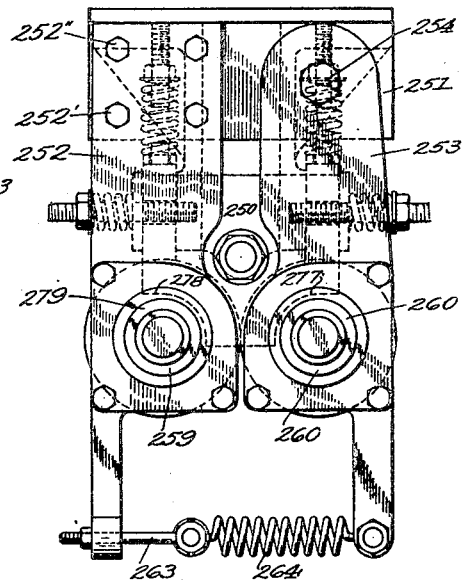
Figures 44 and 45 are side and front elevational views of the apparatus of Figure 43.
Figure 45:
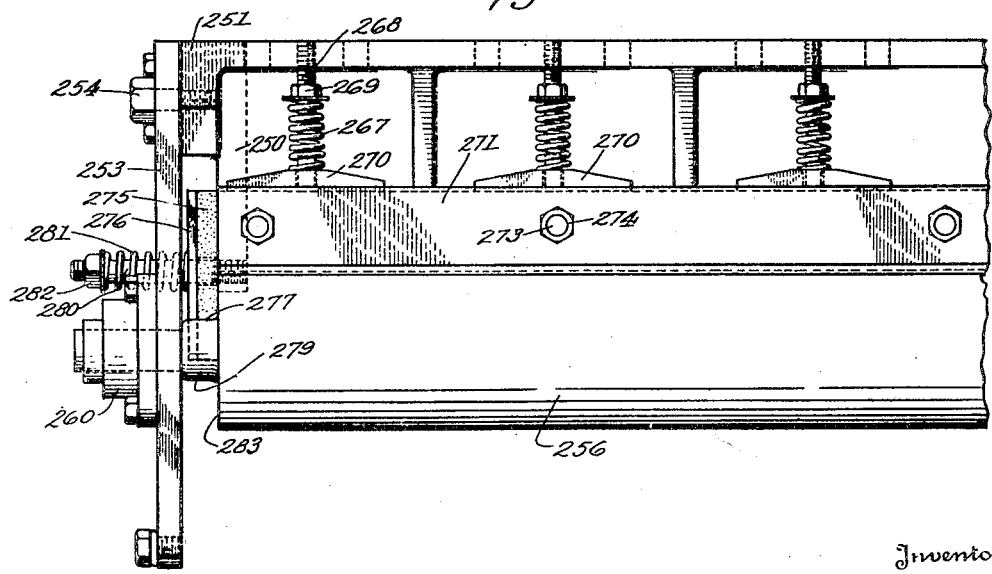

The looper represented diagrammatically at 11 in Figure 1, comprises a plurality of lower rolls 15 journalled for rotation upon a suitable fixed platform 16; upper rollers 17, rotatably carried by a vertically movable frame 18, and supporting cables or the like 19, suitably counter-balanced by means not shown. The strip follows a serpentine path in the looper 11, thereby providing a reserve supply of strip, and then passes around a first guide roll 20, from where it is drawn through a gas-tight, roll seal 21 into the first heating chamber 22. The seal 21 may be constructed substantially in accordance with the showing in Figures 43-45, described in detail below. An upper furnace roll 24, disposed in the upper end of the annealing furnace at the point of junction between the vertical chambers 22, 25 guides the strip through the chambers. During its passages through the chambers 22, 25, the strip is subjected to radiations from highly heated electrical heating elements 26, arranged in groups or zones, as described below and continuously maintained in heated condition by suitable control means.

The highly heated strip is drawn downwardly through an opening in the floor of the chamber 25 into a roll housing 27, where it is trained about rolls 28, 29 for delivery to the first cooling chute 30. The several cooling chutes 30–35 are connected at their upper and lower ends by roll housings 36, 37 having guide rolls 38, 39 therein, over which the strip is trained for movement through the chutes successively where it is subjected to rapid cooling, as explained below. At the lower end of the chute 35, the strip passes through a second gas-tight roll seal 21 and thence under the last guide roll 14 to a reeling device or the like.

The heating chambers 22, 25 and the interiors of the several cooling chutes are in communication with each other, but are sealed from the external atmosphere by the gas-tight seals 21 and by having all of the connections between the several sections hermetically sealed, as by bolted and gasketed joints. An oil or oil and sand seal 40 may be provided around the line of junction between the removable cap 41 for the heating section and the furnace walls, as explained more particularly below in connection with the form of furnace shown in Figure 4. An atmosphere of a non-oxidizing gas is maintained in the interior of the heating and cooling chambers, preferably at a pressure sufficiently above atmospheric pressure to prevent the inadvertent entry of air. Clean fuel gas burned in an insufficient supply of air will provide an atmosphere which will protect the steel during the annealing operation, if it is dried sufficiently and burned to a suitable analysis, for instance, $CO_2$ 5–6%; $CO$ 10–12%; $H_2$ 10–13%; and $N_2$ balance. It is important that the gas be dried before it is introduced into the furnace, so that there is at least twenty times as much $H_2$ as $H_2O$. A pressure of 0.2 inch water pressure above atmosphere, maintained in the furnace and in the cooling chambers has been found to be sufficient to prevent the entrance of atmospheric air. Any air that does enter the furnace immediately combines by burning with the highly heated hydrocarbon atmosphere therein.

As described below in detail in connection with the form of cooling chutes shown in the apparatus of Figure 4, certain of the chutes 30–35 may be water-jacketed to provide rapid, positive cooling, while others may have associated therewith positively driven fans for circulating the gaseous medium in the chutes over the surfaces of water cooled conduits and then over the surfaces of the strip to effect further cooling of the material.

Preferably, the sections in the chute 30 are water-jacketed, as shown in Figures 30–32 and described below, while the sections in chutes 31–34 are of the type shown in Figures 28 and 29 and may have associated therewith, positive gas circulating and cooling means, described below.

The heating elements 26 preferably are of the type shown more in detail in Figures 8 and 10 and are connected in banks on opposite sides of the heating chambers in series, as indicated diagrammatically in Figure 49 so that opposite sides of the strip are subjected to equal heat radiations. Each bank may include four rows of loops or festoons in series, and a pair of banks of elements on opposite sides of the chamber constitute a heating zone. As indicated in Figure 1, the furnace comprises sixteen zones, each of which may be independently controlled, as indicated by controllers C1, C2, etc. in Figure 49. Usually, the two banks of heating elements in each zone, connected in series, receive current from a suitable source of supply L1, L2, in parallel with the elements in other zones, but it is often found desirable to connect all of the elements in two or more zones together in series.

In any event, in the operation of the furnace according to the method of the present invention, the heating elements 26 are maintained continuously in highly heated condition by continuously conducting current therethrough, as distinguished from providing a fluctuating current supply. The total amount of current conducted to the heating elements is determined by connecting certain of the elements in parallel or in series, or by cutting out certain elements, and, this, in turn, depends upon the gauge and width of the strip steel being annealed. For instance, on a strip having a width of thirty inches and a thickness of .0115, the heating elements are energized with a total constant input of 720 kw. The strip travels at substantially 205 feet per minute and remains in the annealing apparatus, including heating and cooling chambers, a period of one minute and forty-five seconds. The maximum temperature to which the strip is raised is approximately 1625° F., followed by heating at progressively lower temperatures to eliminate any transverse inconsistencies in the temperature gradient. The strip leaves the heating chamber at substantially 1400° F. and, by means of the water-jacketed cooling chutes is reduced, in about fifteen seconds to a temperature of substantially 1050° F. During the next thirty-five seconds in the subsequent cooling chutes, the temperature is reduced to substantially 275° F. In the final, air-cooled chute or chutes, the temperature is reduced from 275° to about 175° F., in a period of twenty-five seconds, whereupon the strip may be safely exposed to atmospheric air without any substantial danger of oxidation or scale formation.

It must be understood that the invention is not limited to the particular figures given above, as, for different strip speeds, different temperatures are maintained in the heating and cooling chambers. For instance, the following figures illustrate typical temperature, by zones, for a run of .0115 gauge steel, drawn through at 210 feet per minute:

| Zone | 1 | 2 | 3 | 4 | 5 | 6 | 7 | 8 |
|---|---|---|---|---|---|---|---|---|
| Temperature, °F | 1,520 | 1,575 | 1,610 | 1,640 | 1,660 | 1,700 | 1,715 | 1,740 |

| Zone | 9 | 10 | 11 | 12 | 13 | 14 | 15 | 16 |
|---|---|---|---|---|---|---|---|---|
| Temperature, °F | 1,670 | 1,635 | 1,605 | 1,575 | 1,545 | 1,495 | 1,450 | out |

The total kw. input in the above run was 720. The annealed steel tested as follows: Erickson, 860; Olsen, 335; Rockwell, 52–B.

The furnace shown in Figure 1 is provided with an electrical pyrometer for each heating zone (consisting of two banks of heating elements, one on each side of the strip) and a controlling potentiometer for each group of three zones. Hence, the temperature conditions in the furnace may be observed at all times.

An important feature of the present invention is the adjustment of the current input and consumption to the thickness of steel being annealed. If the current input and the thickness of the strip remain constant, a constant annealing result will be accomplished, providing the time element (speed of travel of the strip through the furnace) remains constant. Difficulties are encountered if attempts are made to control the temperature in the furnace by manually varying the flow of current to the heating elements, or by automatically, through a thermostat control, cutting certain of the elements into and out of operation. Wide fluctuations in the annealing results have been found to follow from such methods, since there is necessarily a very substantial lag in changing the conditions of the heating elements, with the result that, for at least a substantial period of time in the annealing cycle, the elements are either too hot or too cold.

In accordance with the present invention, the current input to the heating elements remains constant for a particular gauge of strip steel, so that there are normally no substantial fluctuations in the temperature of the elements. Compensation for minor variations in the thickness of the strip, for instance, such as may be encountered at the ends of the rolls, is effected by controlling and varying the speed of travel of the strip through the apparatus. That is, when heavier portions of the strip are travelling through the heating zone, the speed of travel is decreased, to enable the thicker material to absorb a greater amount of heat and to extract, from the heating zone, a number of heat units in a given length of time equivalent to that extracted by the more rapidly moving, thinner strip sections. Conversely, if the strip contains thin portions, its speed of travel is increased somewhat, thereby maintaining the strip and the elements at a substantially constant temperature.

The following table gives typical figures as to width, current input and speed of travel of certain standard gauge strip steel when annealed in the apparatus of Figure 1. Also, figures for Erickson, Olsen and Rockwell tests are given.

| Width | Thickness | K. W. Req. | Speed | Erickson | Olsen | Rockwell |
|---|---|---|---|---|---|---|
| 30″ | .0068 | 360 | 195 | 800-830 | 300-320 | 53-55 |
| 31¼″ | .0107 | 720 | 220 | 800-830 | 300-320 | *53-55 |
| 30″ | .0096 | 660 | 210 | 820-840 | 305-325 | 49-52 |
| 30″ | .0115 | 720 | 205 | 840-860 | 310-340 | 48-52 |

When operating with .0115, thirty inch strip, the output of this furnace is 160 tons per 24 hour period of operation. In actual operation, the annealing cost in connection with this furnace has been reduced 60%, as compared with prior batch annealing methods.

Figure 3:
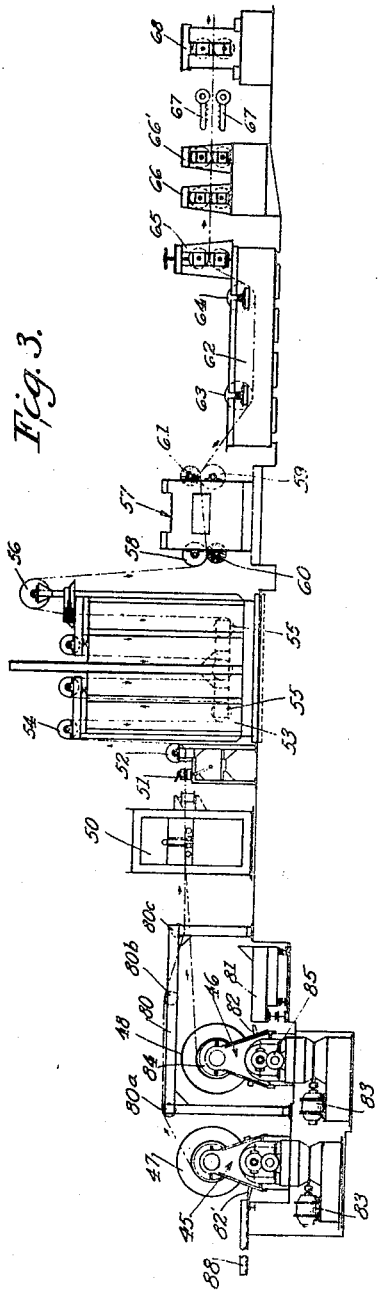
Figure 3 is a diagrammatic side elevation of the same.
Figure 4:
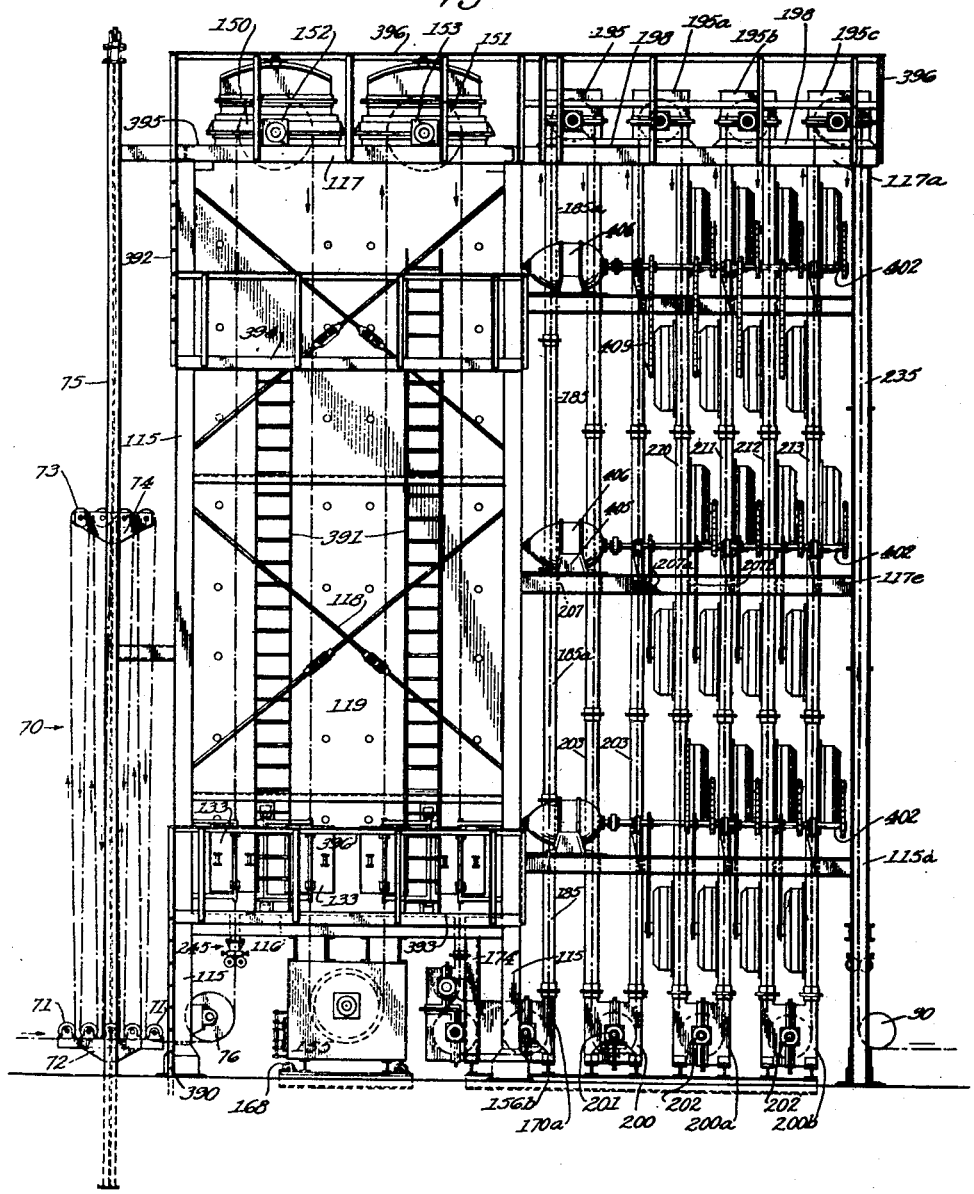
Figure 4 is a side elevation of a preferred form of annealing apparatus, with certain parts removed for the sake of clarity.

The broad principles of operation and features of construction, described above in connection with the apparatus shown diagrammatically in Figure 1, are incorporated in the apparatus of Figure 4, together with additional structural refinements, inventions and improvements. The strip handling equipment shown in Figures 2, 3, 5 and 6, as stated above, may be employed with either form of furnace, disclosed in Figures 1 and 4, or equivalent devices may be employed.

Figure 2:
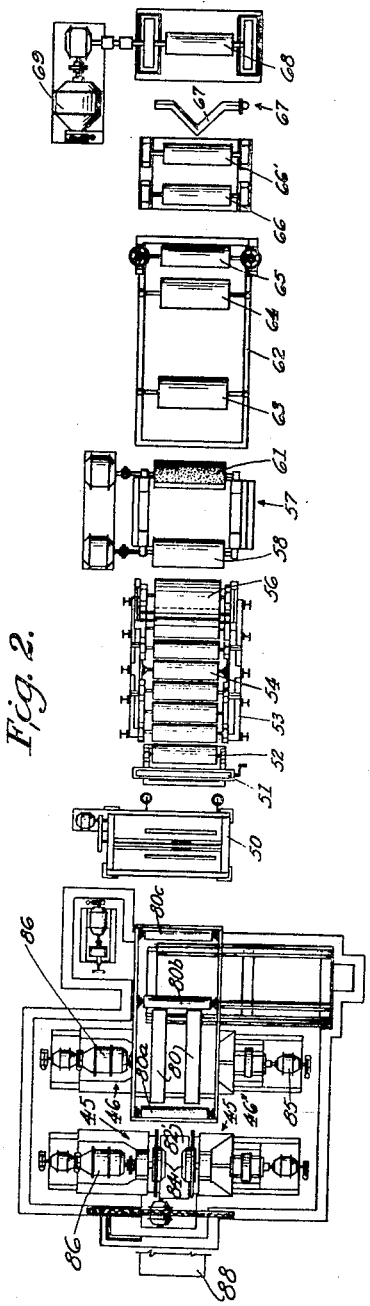
Figure 2 is a diagrammatic plan view of a preferred arrangement of strip handling and treating instrumentalities on the infeed side of the annealing apparatus.

In Figures 2 and 3, two coil supporting devices, represented generally at 45, 46, deliver strip steel alternately from coils 47, 48 supported thereon. The strip passes through a welding machine 50, a tension device 51, under a guide roll 52 and to and through a tank 53 having a hot alkaline solution therein. The strip is guided through the tank in a serpentine path by upper and lower rolls 54, 55, with the result that substantially all of the palm oil on its surface is dissolved and removed. A guide roll 56 leads the metal to and through a scrubber 57 having rolls 58, 59 and brushes 60, 61 associated therewith to scrub both surfaces of the strip and loosen any traces of palm oil, scale or alkali material still adhering thereto. The loosened material is rinsed off in a hot rinse water bath in a tank 62, through which the strip is guided by rolls 63, 64. A plurality of wringers 65, 66, 66' and hot air blowers 67 remove all water from the surface of the strip and effectively dry the same, whereupon it passes through a pair of pinch rolls 68, driven by an electric motor 69, the latter constituting the main drive for unwinding the strip from the unreeling devices 46 and 47 and for drawing the strip through the alkali tank, the scrubber, the rinsing tank and the wringer rolls.

From the pinch rolls 68, the strip passes to the first roll of a looper 70 (Fig. 4) or to the first lower roll 15 of the looper 11 (Fig. 1). The looper 70 comprises a plurality of lower rolls 71 journalled on a fixed lower frame 72 and a plurality of upper rolls 73 journalled on a vertically movable frame 74, supported by cables 75 and an appropriate counterweight, not shown. The strip passes over the several rollers in a serpentine path, to provide a reserve supply of strip between the main supply constituted by the coils 47, 48 and the entrance guide roll 76 of the annealing furnace, to permit the strip, behind the looper 70 to be stopped while the leading end of a new reel of steel is welded to the trailing end of an exhausted reel, while permitting a continuous delivery of strip from the looper to the annealing furnace.

Referring to Figures 2 and 3, when the supply of steel on one of the coils 47, 48 for instance, the latter, is exhausted, and when the end of the strip has substantially reached the welder 50, the supply of current to the motor 69 which drives the pinch rolls 68 is cut off, thereby halting the movement of the line behind the pinch rolls. The leading end of the strip in the coil 47 has previously been led over a framework 80, including guide rolls 80a, 80b and 80c, substantially into proximity to the welder 50. The end of this strip is now placed over the rear end of the first strip in the welder and a plurality of spot welds or one or more continuous transverse welds are quickly made, to join the strips together. Meanwhile, strip steel is continuously drawn into the furnace from the reserve supply in the looper, and the upper frame 74 is thereby drawn downwardly against the action of its counterweight. As soon as the weld has been completed by the welder 50, the motor 69 is started and strip is drawn through pinch rolls 68 at a speed above the normal delivery speed, to replenish the supply in the looper 70, while continuing the delivery of strip to the annealing furnace. Strip is then continuously drawn from the coil 47 at normal running speeds.

A new supply of material, in the form of a new roll or coil, is placed upon a transversely travelling car 81 (Fig. 3) and moved into position immediately in front of the unreeler 46, under the frame 80. The car 81 may be tipped rearwardly, or the coil otherwise rolled onto an elevating platform 82, disposed centrally relative to the coil supporting device 46. By appropriate means, such as an electric motor 83, the elevator 82 is raised, to align the axis of the new coil 48 with the rotatable heads 84 of the coil holder 46. Additional motors 85 operate through appropriate transmission mechanisms to move the rotatable heads 84 and their supporting brackets 46 axially toward or from one another to clamp or release the reels therebetween. After the new reel has been so gripped by the heads 84, the elevator 82 descends to an inoperative position and the car 81 is moved transversely to pick up a new supply of strip steel. The motors 85 may be moved in unison, in either direction, to move both heads 84 axially, simultaneously in either direction, to effect an accurate alignment of the new coil with the welding machine, guide rolls, tension devices and the like. This independent adjustment of the coil supporting heads is of considerable importance when coils of varying standard widths are employed.

One or both of the rotatable heads of each reel supporting device is connected through appropriate driving mechanism to an electric motor 86, to facilitate initial unwinding of the leading end of the strip, for attachment to the trailing end of the previous strip. This motor, moreover, serves as an electric brake during the normal operation of the apparatus, by simply changing its connections to convert it to function as a dynamo, whereby an accurate control for the tension on the strip is effected.

When the coil 47 is exhausted, the trailing end of the strip thereon is welded to the leading end of the new coil 48 and a new roll 47 is mounted in the coil support 45 by rolling the same along a table 88 onto an elevator 82', similar to the elevator 82 and controlled by an electric motor 83'. Since the actuating means for the coil support 45 are substantial duplicates of corresponding elements associated with the unreeling device 46, they will not be described in detail. Thus, strip is continuously delivered to the annealing oven, first from one roll of metal and then from the other, alternately, and a new roll is positioned in operative relation to its unreeling device while the strip is being delivered from the other roll.

On the discharge side of the furnace, the annealed strip, as it leaves the last cooling chute, travels under a guide roll 90 (Fig. 4) or under the guide roll 14 (Fig. 1) and through positively driven master pinch rolls 91 (Figs. 5 and 6), which serve to draw the strip through the heating and cooling chambers of the annealing apparatus, as described in detail below. A looper represented generally at 93 is interposed between the pinch rolls 94, the latter serving to draw the strip through the looper. The strip next passes through a looper box 95, a quick-release tension device 96, side guide, centering rolls 97, additional tension devices 98, 99 and over a guide roll 100, which leads the strip to the reeling device 101, where the strip is wound up into the form of a coil on a mandrel 102.

The reeling device 101 includes an expansible and contractible mandrel 102 having an axially extending slot 103 in its periphery, the parts of the mandrel being so arranged that, when the mandrel is driven forwardly in a clockwise direction by its driving motor 104, the mandrel is in the expanded position and the slot closed, with the end of the strip firmly clamped therein. When the mandrel is rotated ahead relative to its supporting shaft or the latter rotated rearwardly relative to the mandrel, while the mandrel is held by the brake 107, the movable parts of the mandrel contract and release the clamped end of the strip, whereby the coil may be withdrawn by axial movement over the free end of the mandrel. The speed of rotation of the mandrel is controlled by an arm 105 having an end engaging the surface of the coil and connected to a rheostat 106, so that, as the coil increases in size, the current delivered through the rheostat to the motor 104 is varied to decrease the speed of the motor. The brake 107, controlled by a suitable foot pedal 108, quickly stops the mandrel and holds it stationary while its supporting shaft is reversed by reversing the motor 104, to contract the mandrel.

Beneath the reeling device 101, there is a transversely movable car 109, mounted on trackways 110 for movement between a position under the mandrel 102 and a discharge position in alignment with a runway 111. An elevator 112 carried by the car may be raised to engage and support a completed coil on the mandrel, when the mandrel has been arrested and contracted. The car 109 also carries at its innermost end an upwardly projecting stripper block 113, which normally projects behind the end of the coil while the latter is being wound upon the mandrel. Hence, when the car moves outwardly with the coil supported by the elevator, the stripper block 113 strips the coil cleanly from the mandrel, so that the coil may be moved to the discharge position.

Preferably, the elevator 112 comprises three vertically movable supporting blocks which project upwardly through appropriate slots in the upper, inclined face 114 of the car 109. Hence, when the elevator blocks are lowered at the discharge position, the coil engages the inclined surface 114 and rolls forwardly therefrom, onto the runway 111, where it is held until removal by any suitable means.

The movements of the elevator and the car are preferably effected by suitable pneumatic cylinders, not shown, which may be controlled by manually operated valves 109' or the like.

During the normal operation of the parts on the delivery side of the annealing apparatus, the pinch rolls 91 are driven continuously at a predetermined speed by a motor 91', operating through a speed reducer 91", to draw the strip continuously through the apparatus, for instance, the annealing and cooling chambers shown in Figures 1 or 4. A tachometer 91a may be connected to the motor shaft, to indicate, in feet per minute, the speed of strip travel. The looper 93 is normally in the lowered position, substantially as shown in Figure 6 and the pinch rolls 94 are driven by the motor 94' through speed reducer 94", at the same speed as the rolls 91. The strip is drawn through the looper box 95, the tension devices and the centering rolls 97 by the reeling device 101, driven by motor 104, until a complete coil of metal has been there wound up. At that time, the motors 104 and 94', driving the reeling device 101 and the pinch rolls 94, are stopped and the strip is cut transversely between the guide roll 100 and the reeling device 101. The mandrel is contracted and the coil is removed by the stripper block 113, elevator 112 and car 109. The leading end of the strip, behind the line of cut, is clamped in the mandrel 102 and the reeling device is ready to wind up a new coil. Meanwhile, strip steel has been continuously delivered by the pinch rolls 91 to the looper 93, and the framework 92 carrying the upper rolls 92' has been rising to accommodate the excess metal thus delivered. As soon as the strip has been started on the mandrel 102, the reeling device 101 and the pinch rolls 94 are set in operation and the excess supply in the looper is gradually diminished. In the event that the looper 93 becomes filled to capacity before the reeling device 101 can be re-started, the pinch rolls 94 are, nevertheless, started, to draw the strip through the looper, and the excess material delivered thereby is collected in the looper box, until the reeling device can be operated to handle the strip material in the normal manner. The looper box 95 thus provides a safety factor and accommodates excess strip, since it is of utmost importance that the master pinch rolls 91 operate continuously to draw the strip through the annealing apparatus continuously at a predetermined speed.

The annealing apparatus shown in Figure 4 is generally similar to that described above in connection with Figure 1, but has a greater capacity, since it includes a greater number of heating and cooling chambers and the strip may be drawn therethrough at a somewhat higher rate of speed.

The furnace proper is supported by a suitable framework comprising upright structural members 115, a lower platform 116, and upper, horizontal frame members 117. The frame may be braced by suitable tie rods 118, or the like. The platform 116 supports the furnace casing 119 made up of a plurality of relatively heavy sheet metal sections continuously welded along their meeting edges and reinforced by suitable angle bars and the like to provide a strong, substantially gas-tight casing structure. Referring to Figures 7, 8, 10, 13 and 14, within the casing 119 and supported by the platform 116, there is a refractory brickwork floor 120, and similar side walls 121, 122, front and back end walls 123 and vertically extending partitions 124, 125 and 126, providing four vertical heating chambers 127, 128, 129 and 130. The floor 120 is provided with a plurality of relatively narrow openings 127a–130a, registering, respectively, with the vertical furnace chambers. At their upper ends, the chambers terminate in restricted throats 127b–130b, respectively, which communicate with roll chambers 131, 132, lined by continuations of the side and end walls and the vertical partition 125.

The space between the brickwork walls 121, 122 and 123 and the metal furnace casing 119, is packed with suitable heat insulating material, such as rock-wool, asbestos, or the like.

At the lower ends of the vertical chambers 127–130, access doors 133 having suitably refractory linings 134 are supported for swinging movement to and from closed position by hinge bars 135 (see Figs. 4 and 13). Hence, the floor of the heating chambers may be inspected and cleaned from time to time.

At its upper end, the furnace casing is offset inwardly at 136 to provide two independent casing extensions defining the two roll-receiving chambers 131 and 132. The casing extensions terminate at their upper ends in two series of flat, horizontally disposed plates 137, providing two rectangular bases (Fig. 16) for rectangular, channel-forming collars 138, one of which is shown in detail on an enlarged scale in Figures 21–24. As shown in Figure 23, each collar comprises an inner angle member 138a, and a vertical, outer plate 138b, continuously welded thereto and braced by triangular pieces 138c, thereby providing a marginal channel 138d which cooperates with a hood, described below, to provide a substantially gas-tight seal for each roll chamber.

As shown in Figures 16, 17 and 19, the upper casing 135 and the horizontal base 137 for the collar 138 are recessed at 139 to provide spaces for the reception of water-cooled roll shafts hereinafter described. Likewise, the collar 138 (Fig. 22) has an upwardly projecting recess 139', formed by a vertical plate 138e and a semi-cylindrical plate 138f, providing a rounded hump in the channel 138d, directly above the recess 139, when the parts are assembled.

The roll chambers 131, 132 are closed by hoods or caps 140, shown more particularly in Figures 12, 25, 26, 27. Each hood comprises side and end walls 141, a curved top wall 142, suitably reinforced by angle straps 143 carrying lifting eyes 144, and a refractory brickwork lining 145 for the top and sides. The sides and end walls of each hood carry outwardly and downwardly projecting flanges continuously welded together and to the hood and providing a sealing skirt 146, having a free edge adapted to be received in the channel 138d of the collar 138, as shown in assembled relation in Figures 7 and 8. The end walls of the hoods, at opposite points, are recessed upwardly at 147 to provide a space aligned with the recesses 139, 139', to accommodate the water-cooled roll shafts previously mentioned. A semi-cylindrical plate 147a (Fig. 27) defines the recess and is positioned to embrace the shaft.

Rolls 150, 151 (Figs. 4, 9 and 11) are fixed to hollow shafts 150', 151', journalled in outboard bearings 152, 153 carried by the upper, horizontal frame members 117. The spaces between the shafts and the arcuate recesses 139, 139', and 147 of the roll housing structures are closed by packing glands 152', 153' (Fig. 9), bolted to the exterior face of the casing wall extensions 135 and the collars 138, bolt holes 135a being provided for that purpose (Figs. 19 and 22).

As stated above, the shafts 150', 151' are hollow for the circulation of cooling water through suitable connections at their ends, not shown. As the description of the present invention progresses, it will be apparent that many parts of the apparatus are water-cooled, but the cooling water circulating pipes have been omitted from the drawings, since they would only tend to obscure other parts.

Below the horizontal platform 116, there is a roll casing, represented generally at 155 in Figures 4 and 14. The casing comprises a floor member 155a, supported upon transversely disposed I-beams 156 and spaced, longitudinal girders 156a. Side walls 155b, and walls 155c and a ceailing 155d, provided with suitable openings 155e and a refractory, brickwork lining 157 are supported from the floor 155a. An access door 158, provided with a suitable refractory lining, is mounted for swinging movement in a manner similar to the door shown in Figure 13, whereby the casing may be inspected and cleaned.

The spaces between the casing walls and the brickwork lining 157 is filled with insulating material 157a. The front end wall 155c is made up of a plate bolted to the reinforced margins of the casing surrounding an opening at that end. The plate may be removed and the insulation at that end broken down, if it is desired to remove the large roll from the interior of the casing for replacement or repair.

Figure 46:
Figure 46 is a plan view of a cooling water delivery header and return trough.
Figure 47:
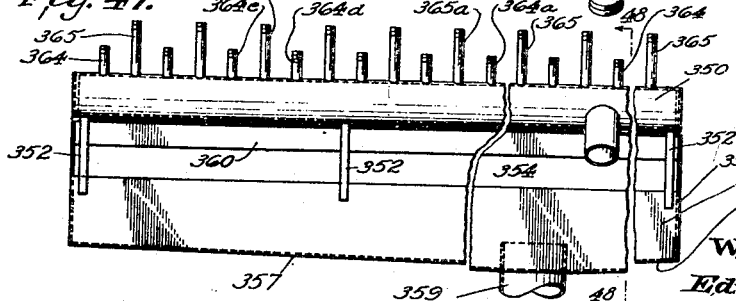
Figure 48:
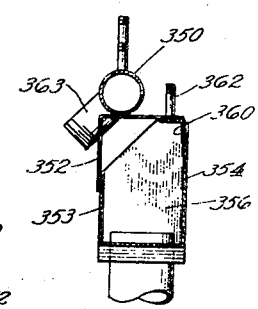
Figure 48 is a vertical section on lines 48—48 of Figure 47.

Both end walls of the casing 155 are apertured and provided with stuffing boxes 159 (Fig. 15), through which the hollow, water-cooled shaft 160 of the lower roll 161 projects, the shaft being journalled in outboard bearings 162 carried by suitable supporting brackets 163 mounted on the I-beams 156. Cooling water from the header shown in Figures 46-48 is conducted by suitable pipes through connections, not shown, to the hollow shaft, to maintain the same in reasonably cool condition.

Projecting through a suitable stuffing box 164 secured to the end casing plate 155c, is a shaft 165, supported at its opposite end in an appropriate bearing in the opposite end wall, and carrying a scraper blade 166, which projects downwardly into contact with the periphery of the roll 161, to scrape any scale or dirt therefrom, so that a clean roll surface is always presented to the incoming strip of sheet metal. On its outer end, the shaft 165 carries an operating handle 167, whereby the position of the blade 166 and the tension with which it is urged downwardly onto the surface of the roll may be accurately determined. The blade is preferably a resilient, special alloy plate, substantially $\frac{1}{16}$ of an inch in thickness, known in the trade as "resistal #7."

Beneath the roll casing 155 there are a pair of rolls 168 journalled on appropriate bearings adjacent the opposite ends of the spaced longitudinal girders 156a, whereby, upon occasion, the strip may be led over the roll 76 and under the rolls 168, to by-pass the annealing furnace entirely.

Disposed beneath the platform 116 and in substantial alignment with the final heating chamber 130, there is a second roll housing 170, having rolls therein adapted to guide the strip from the final heating chamber to the first cooling chamber. As shown in Figure 14, the housing 170 has an upper section 171 communicating through a water-cooled chute section 172 with the opening in the platform 116 which is aligned with the slit 130a in the furnace floor 120. A roll 173, disposed in the upper section 171, is fixed to a hollow, water-cooled shaft journalled for rotation in outboard bearings 174 carried by brackets secured in vertical channels 174' extending between supporting I-beams 182 and the furnace platform. Appropriate stuffing boxes surround the roll shaft to prevent the escape of gas. The sides of the casing are provided with suitable water-jackets 175, 175a, the latter of which is extended horizontally at 175b over the top wall of the casing proper. The strip is guided under the roll 173 and thence about the lower rolls 176, 177, similarly journalled in bearings 178, 179. The bearings 178, like the bearings 174, are supported by the vetrical channel 174', while the bearings 179 are carried by brackets 177. A dirt catching trough 173' extends lengthwise of the casing below the roll 173 and above the roll 176, to prevent the entrance of dirt or scale between the strip and the periphery of the latter roll. The side and end walls of the casing likewise are water-jacketed, as indicated at 180, 181, to maintain the rolls in reasonably cool relation and to extract heat from the strip passing through the casing. The casing 170 is supported by suitable I-beams 182 or the like.

The cooling section of the apparatus comprises a vertical frame including upright structural members 115a, a pair of upper horizontal I-beams 117a, tranverse members 117b and intermediate transverse members 117c. The upper frame members 117b and 117c support two pairs of casing assemblies, providing four similar roll housings 195, 195a, 195b and 195c, each of which has communication with a pair of vertical chutes. The first housing 195 preferably is provided with outboard bearings 196 (Fig. 9) for a hollow, water-cooled shaft 196', carrying the roll in that housing. The shafts for the rolls in the other roll housings may have bearings 197 associated with the end walls of the housings, since they need not be water-cooled. Each pair of housings 195, 195a and 195b, 195c is mounted upon an individual base 198, supported on the transverse frame members 117b and 117c.

Certain of the cooling chutes are supported by roll housings 200, 200a, 200b (Fig. 4), each of which is made up of two sections similar to the casing section 170a of the roll housing 170. The first casing 200 is provided with outboard bearings 201 for the hollow water-cooled roll shaft, while the other two may have bearings 202 carried directly by the casing end walls.

The strip passes under the roll 177 and is drawn upwardly through a casing section 170a, which, at one side, is bolted, with a suitable gasket interposed, to the casing 170 and at its upper end 170b is provided with a flange which may be similarly bolted to the lower end of a first cooling chute section 185 (Figs. 4, 30 and 31). Each chute section 185 (Figs. 30 and 31) comprises double-thickness side walls consisting of plates 186, 187 held in spaced relation by short pipe sections 188, and rivets 189, or the like, to which the plates are welded, thereby providing water-jackets 190, for the circulation of cooling water through pipe couplings 191, 192. Each section is provided with angle iron flanges 193 at its upper and lower ends having appropriate bolt holes therein, whereby they may be bolted to corresponding flanges of the adjacent sections, with gas-tight gaskets interposed between adjacent flanges, the lowermost flange 193 being bolted to the flange 170b of the casing section 170a (Fig. 14).

The water-cooled chute sections 185 are thus secured together in end to end relation. The intermediate chute section 185a is further secured to a transverse, horizontal channel member 207 by clips 208 welded to the end walls of the chute and bolted to the channel. In order to provide a space for the channel 207, one of the water-jackets 190a is relieved at the upper end, as shown in Figure 32.

Figure 34:
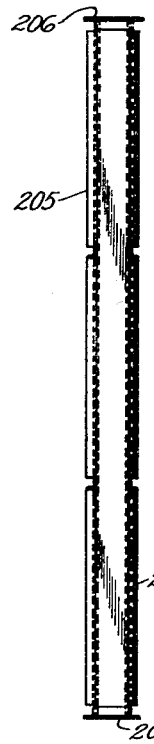
Figure 35:
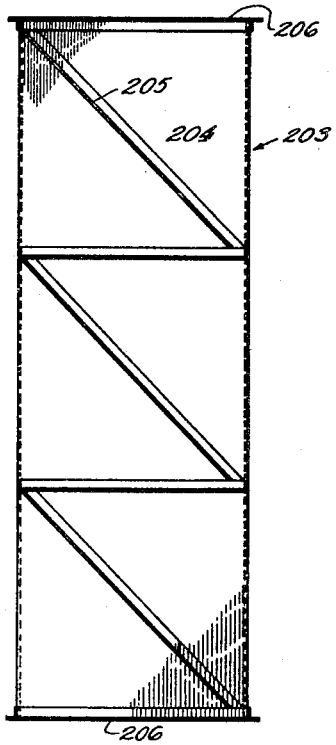
Figure 36:
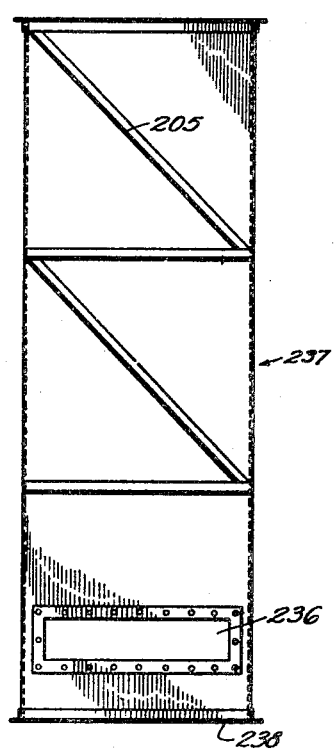
Figures 38, 39:
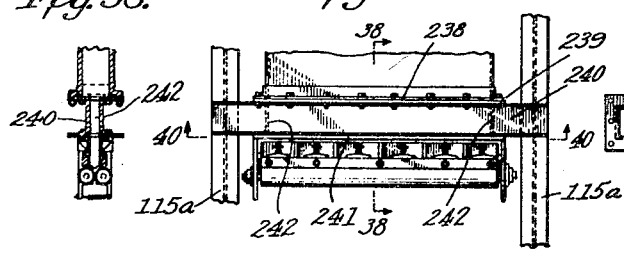
Figure 37:
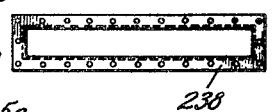
Figure 37 is a bottom plan view thereof.
Figure 40:
Figure 40 is an inverted horizontal section taken on line 40—40 of Figure 39.

The chute sections 203 disposed between the lower roll casing 200 and the upper roll casings 195, 195a preferably are constructed substantially in accordance with the showing of Figures 34 and 35. These sections have walls 204 of single thickness, with angle iron reinforcing strips 205, welded thereto, so as to give the sections the required rigidity. The sections are bolted together in end to end relation, and to the roll housing, with gaskets between their end flanges 206. One or more of the sections 203 may be attached to cross-channels in a manner similar to that shown in Figure 23. The chute sections 203, however, are cooled by exposure to room air alone.

The chutes 210, 211, 212, 213 connected, respectively, to the upper roll housings 195a, 195b and 195c and lower roll casings 200a, 200b are made up of sections having means associated therewith for cooling the atmosphere in the chutes and for positively circulating the same over the surfaces of the strip passing therethrough. A typical section is shown in Figures 28 and 29, while the cooling means are shown in Figures 41 and 42. Each section comprises side plates 214, 215, reinforced at one end by angle members 216 and cut away at the opposite end to provide an opening 217, defined by marginal flanges 218, to which fan housings and cooling assemblies 219 may be bolted. Preferably, one side wall 214 has its reinforcing elements at the upper end and the fan opening at the lower end, while the corresponding parts are arranged in the opposite relation in association with the other wall 215. The sections are bolted together in end to end relation as previously described, and are secured to transverse channels 207a by angle clips 208a welded to the sections and bolted to the channels.

Referring to Figures 41 and 42, each cooling unit 219 comprises a marginal frame 220 formed of angle iron strips appropriately welded together at their corners. These strips may be bolted to the frame 218 associated with the chute section. A casing 221 extends rearwardly from the frame 220 and encloses a fan 222 carried by a shaft 223 journalled in a bearing and stuffing box assembly 224. A sprocket or any suitable driving means may be connected to the shaft 223, exteriorly of the hood or casing 221 to drive the fan.

A rectangular frame comprising plates 225, 226, mounted within the main frame 220, serves as a support for a plurality of cooling coils 227 having cooling fans 228 associated therewith. Cooling water is circulated upwardly through coils 227 and through connections 229, 230 which extend outwardly through the frame 220. A fan hood 231 divides the interior of the casing into two chambers 232, 233, for the circulation of gas by the fan from the chute outwardly through the outer chamber 233, then inwardly through the inner chamber 232 over the surfaces of the cooling coils 227, and against the surfaces of the strip travelling through the chute. Thus, hot gas is withdrawn from the cooling chute and is blown over the cooling coils, where its heat is extracted. The cooled gas then passes directly over the surfaces of the strip, to extract the heat therefrom, thereby providing rapid positive cooling.

If desired, one or another of the cooling and gas circulating assemblies may be removed from its associated chute and a simple flat plate, or a water-jacketed plate, substituted, depending upon the rate of cooling desired. In the alternative, one or another of the fans 222 may be disconnected and rendered inoperative, to decrease the cooling effect of that section. Moreover, the speed of rotation of the fans and the volume of flow of cooling water through the cooling coils 227 may be independently varied at will, to control the effective cooling of the various sections.

A preferred drive for the fan units is shown in Figures 4 and 28. Certain of the transverse channel members 207, 207a, etc. carry upwardly projecting brackets 400 having bearings 401 at their upper ends, in which one or another of the shafts 402 are journalled. The transverse channel members also support motor brackets 405 carrying motors 406, connected to the shafts 402.

As indicated in Figure 4, each shaft 402 drives a bank of eight fan units, by means of sprockets 407 and upwardly and downwardly extending sprocket chains 408, 409, trained about similar sprockets 410, 411 on the fan shafts 238. The upper chains 408 incline upwardly and rearwardly from the axis of the shaft 402 to the axis of the several fans in the upper fan casings, while the lower sprockets 409 incline downwardly and rearwardly toward the sprockets associated with the lower fans.

Thus, the twenty-four fan units in the arrangement disclosed in Figure 4 are arranged in three banks of eight units each, and three driving assemblies and motors serve to drive them all.

The final cooling chute 235, which is disposed behind the vertical I-beam 115a in Figure 4, comprises a plurality of sections similar to those shown in Figures 34–37, which sections are cooled by room air alone. An access door 236 may be provided at the lower end of the lowermost section 237.

The lower, terminal flange 238 of the lowermost section is bolted to a plate 239, which, in turn, is welded to upper flanges of transverse channel members 240 carried by the uprights 115a. A similar plate 241 is welded to the lower flanges of the channels 240 and the space between the channels is closed by transverse plates 242, appropriately welded in place, whereby the channels 240, the upper and lower plates 239, 241 and the end plates 242 define an enclosed discharge chamber, which is gas-tight, except for slots 243 in the plates 239, 241, through which the strip steel is drawn. As previously explained in connection with similar bolted joints, a gas-tight gasket is interposed between the flange 238 of the lowermost chute section and the upper plate 239.

The lower plate 241 supports a gas-tight roll seal assembly 245, the latter being bolted thereto with an appropriate gasket interposed between its attaching flange and the plate.

A similar assembly 245 is carried by a downwardly projecting water-jacketed throat 246 associated with the first heating section 127 (Fig. 14) of the annealing furnace. Since both gas-tight roll seals are substantially identical, only one need be described, reference being had particularly to Figures 43–45.

Each seal assembly includes an upper housing member which is preferably a unitary casting including side walls 247, 248, upper attaching flanges 249 and end walls 250. The end walls 250 terminate in outwardly projecting wings 251, to which roll supporting brackets 252, 253 may be attached, the former being a stationary roll bracket, secured by four bolts 252', and the latter being a movable bracket pivoted for limited swinging movement about the axis of an attaching bolt 254. Rolls 255, 256, fixed upon shafts 257, 258, are journalled in bearings 259, 260 carried, respectively, by the fixed and pivoted roll supporting brackets. The brackets are provided with downwardly projecting arms 261 and 262, connected together by an adjustable link 263 and a tension spring 264, whereby the movable roll supporting brackets and the roll 256 are urged constantly toward the stationary brackets and the fixed roll 255.

The downwardly projecting side flanges 247, 248 of the main housing carry elongated sealing bars 266 of hard packed felt, or the like, urged downwardly into contact with the roll peripheries by compression springs 267, surrounding bolts 268 depending from the flanges 249 and interposed between nuts 269 and shoes 270. The bars 266 are pressed inwardly into firm sealing contact with the flange 247, 248 by presser strips 271 and compression springs 272, surrounding bolts 273 and urged inwardly by nuts 274. This construction provides a substantially gas-tight seal between the sides of the strip and the rolls and between the rolls and the side walls of the main housing.

A seal is effected between the end walls 250 of the housing and the rolls 255, 256 by hard, pressed felt, end dam members 275, urged inwardly toward the outer face of the end walls by presser plates 276. The end dams 275 and the plates 276 are provided with arcuate cutout corners 277, 278, in peripheral engagement with reduced end portions 279 of the rolls 255, 256. These members are supported by bolts 280 and are urged inwardly against the end faces 283 of the rolls 255, 256 by springs 281 and nuts 282.

Hence, a substantially gas-tight seal is provided. The only space through which gas may pass is the small space between the rolls 255, 256 at the ends thereof, between the strip passing through the rolls and the end dam members.

The only differences between the two gas-tight roll seals at the entrance end of the annealing furnace and at the discharge end of the last cooling chute are that the rolls 255, 256 of the entrance assembly are steel, while at the outlet, it is preferred to use tightly packed cloth disc rolls. Rolls of the latter type consist of a plurality of circular, radially disposed cloth discs threaded on an axial shaft and subjected to axial compacting pressure. Since such rolls are known in the art, they are not shown specifically herein.

In some cases, it has been found desirable to positively drive the rolls 255, 256 at the entrance end of the apparatus, since the strip at that time is coated with palm oil and is quite slippery. To this end, the roll shafts may be provided with intermeshing pinions, to cause the rolls to move in unison, and one of the shafts may carry a pulley 257', driven by a belt 257a, trained about a pulley 257b carried by the first guide roll 76.

All of the various individual parts of the casing sections, chute sections, roll housing sections and the like are preferably welded together with continuous welds to provide gas-tight seams. The individual sections in turn are preferably bolted together with gaskets interposed between the joints, so that the apparatus, as a whole, is substantially gas-tight. When it is necessary to remove one part from another, or otherwise to disassemble the apparatus, the bolts may be readily removed and the sections taken down.

As a result of this construction, leakage of gas from the interior of the furnace and from the cooling chutes is reduced to a minimum. The gas-tight roll seals likewise prevent substantial dissipation of gas, while permitting a rapid delivery of the strip into and out of the sealed chambers. A suitable non-oxidizing, hydrocarbon gaseous atmosphere is maintained by continuously delivering a supply of such gas to the interior of the furnace, preferably through four pipe connections, one leading to each heating chamber adjacent the lower end thereof, on the opposite face of the furnace from that shown in Figure 4. As stated above, it has been found satisfactory to maintain the gas in the annealing apparatus at a pressure between .2 and .5 inch of water above outside atmospheric pressure.

Referring to Figures 7, 8, 10 and 49, the strip is heated during its passage through the chambers by radiations from a plurality of banks of radiant electric heating elements 300, 300a and also by the highly heated atmosphere in the chambers. As shown in Figure 10, the heating elements are preferably arranged in banks comprising four rows of loops or festoons, each constituting a series continuation of the next. One row of festoons 301 is supported by hanger lugs 302 comprising integral projections associated with insulator blocks, built into the brickwork of the furnace. Each series of blocks, in the arrangement shown, includes seven triple hanger blocks, each having three lugs thereon, and one single hanger block. An important feature of the heating elements is that the festoons gradually and progressively increase in length from opposite ends toward the middle. For instance, the middle loops may be substantially 6.6", while the end ones are 3.8", measured from the top of the hanger lugs to the bottoms of the festoons. Each series may include twenty or twenty-one downwardly projecting loops and the loops may be formed from the .128" by 1" NiCr ribbon.

The variation in the lengths of the loops prevents overheating of the edges of the steel strip being annealed and provides a substantially uniform temperature gradient entirely across the strip. Preferably, the longer loops 305 at the center of each series are positively maintained out of contact with each other by guiding projections or lugs carried by special insulating guide blocks 304, mounted in the furnace wall, below the hanger blocks.

As stated above, the heating elements are arranged in banks of four rows of festoons, connected in series at their ends by continuations 306, 307, 308, and 306a, 307a, 308a (Figure 49), the elements and supporting and guiding means of each row being of the same construction. The ends 310 of the heating elements project rearwardly through the furnace brickwork and insulating material, where they are doubled back upon themselves, as at 311 (Figure 11) and welded together and welded to the bifurcated end 312 of a binding post 313, the latter being carried by an insulating plate 314 secured to the furnace casing by bolts 315 or the like, in gas-tight relation with an appropriate gasket interposed between the plate and a reinforcing strip 316 welded to the casing around the opening for the binding post. The binding post 313, which is preferably of Monel metal, has a Monel collar 313' welded thereto, carrying a plurality of pins 317 projecting into sockets formed in the insulating plate 314, to prevent twisting of the post and the heating element when the post is clamped to the insulating plate by a nut 318, or when a bus bar or the like is bolted to the outer end of the post by nuts 319.

It will be understood that similar banks 300, 300a of heating elements are mounted on both side walls of each heating chamber as represented diagrammatically in Figure 49, on opposite sides of the strip steel being drawn therethrough. Each bank, similar to that shown in Figure 10, and comprising four rows of loops, will be connected in series, by external connections 400, 401, 402, 403 to the corresponding bank on the opposite side of the strip steel. Each pair of banks thus connected constitutes a single heating zone. As shown in Figure 49 and as pointed out above, the elements constituting each zone are connected in parallel to a source of current, L1, L2 and individual control means, C1, C2, etc. are provided for each zone. A pyrometer tube 325 is provided for each zone, projecting through the furnace end wall between the middle rows of elements, as shown in Figure 10 and as indicated by the dotted circles 325 in Figure 7.

Each bank of heating elements in the heating chambers 127, 128 and 129 has a 30 kilowatt rating, so that, in each chamber, eight 60 kilowatt heating zones are provided. In the final chamber 130, the elements are constructed of ¾ inch ribbon, with the result that each bank has a 20 kilowatt rating, thereby providing a plurality of 40 kilowatt zones. Preferably, in the final heating chamber there are only four such zones.

By connecting the elements of different zones in various ways, as, for instance, by connecting all of the elements of two or more zones in series with each other, or by disconnecting some of the elements entirely by control devices C1, C2, etc., appropriate heating conditions for a wide variety of gauges and widths of strip can be effected.

In Figures 46–48, a preferred cooling water distributing apparatus is shown. This device comprises a horizontally extending header pipe 350, and a return, water-receiving trough 351 secured together by angle clips 352, spaced at suitable distances along the length of the header and the trough. The trough comprises a front wall 353 having its upper edge spaced below the header 350 and the upper edge of the back wall 354, thereby providing a space through which the interior of the trough may be inspected. End walls 355, 356, may be welded to the front and back walls and to the ends of inclined bottom walls 357, 358, which slope downwardly toward an intermediate point where a discharge pipe 359 is welded. An angle iron 360 welded along the upper margin of the back wall 354, supports the brackets 352, carrying the header 350. The horizontal web of the strip 360 is provided with a plurality of apertures 361, through which the return pipes 362 from the various cooling chambers project and to the margins of which they are welded. Thus, the water from all of the cooling sections and the like returns to the trough 357, from where it is discharged through the pipe 359. Since the front wall 352 is relatively low, the flow of water from each pipe 362 to the trough may be continually inspected.

The header 350 carries a supply inlet pipe 363 and a plurality of delivery pipes arranged in a line and alternating between short sections 364 and longer sections 365. The staggered elevation of the ends of the pipes facilitates connection to delivery pipes leading to the various members to be cooled.

Although the invention is not limited to the particular arrangement now to be described, the pipes from the header and the return pipes are preferably connected as follows: The pipes 364 and 365 at the extreme opposite ends of the header are spare pipes, which normally are capped, but which may be used to deliver water to additional water pockets, cooling fans, or the like. To the left of the righthand pipe 365, there are twenty-four connections, each leading through an independent pipe to one of the inlet connections 229 associated with the twenty-four gas cooling fan units, reference being had to Figures 4, 28, 41 and 42. In Figures 46 and 47, only four of these connecting pipes 364, 365, are shown, the remainder being represented by the broken away portion of the header.

The next pipe connection 364a (Figures 46 and 47) leads through an appropriate pipe to the hollow shaft 195, journaled in the bearings 196, at the upper end of the first cooling chute. Water returning from this shaft flows through a pipe in the opening 361 directly behind the delivery pipe 364a.

The next pipe 365a, to the left of the pipe 364a, is connected through suitable branching conduits to the two shafts for the rolls 177 and 201, disposed at the lower ends of the first three cooling chutes and the return water similarly flows through an opening 361 directly therebehind.

The next four connections to the left of the pipe 365a lead to the four water cooled chute sections 185. Each conduit leading to those sections is provided with two branches, one being connected to one inlet nipple 192 associated with one water jacket, and the other to the water pocket on the opposite side of the section. Referring to Figure 31, the water flows upwardly through each water jacket and is discharged through a short spout 370 into a receiving vessel 371, welded to the section and having a funnel-shaped bottom connected to a return delivery pipe 372. Each return pipe is connected to one of the openings 361a or 361b (Figure 46), and it will be noted that, for each of the four pipes leading to the water cooled chute sections, there are two return openings, each adapted to lead the water from one of the two jackets associated with each section. Hence, by inspecting the discharge of water from the return pipes, the operator may determine the amount of water flowing through each jacket.

The next delivery connection 364d of the header leads through branch conduits to the hollow, water-cooled shafts for the two rolls 176, 173, journaled for rotation in the casing 170 between the last heating chamber and the first cooling chute. The next connection 365d may lead to the water jackets associated with the discharge hood 172, below the last heating chamber, while the next pipe 364e to the left thereof may lead, through appropriate branch conduits, to the water jackets 175, 175a, 175b, and 181, on the walls of the casing 170, and also to the water jackets associated with the inlet hood 246, below the first heating chamber. The next three pipe connections lead, respectively, to the bottom furnace roll shaft 160, and to the two top furnace roll shafts 151', 150'.

As stated above, the return water lines from the various cooling jackets and the like, debouch into the trough 351 directly behind the corresponding delivery pipes, with the result that the operator can determine at a glance whether the proper circulation of water through each member to be cooled is being effected. Each delivery line from the header is preferably provided with a manually controlled valve, (not shown) whereby the amount of water delivered to each cooling section may be accurately controlled. In each case the water is led to the water jackets and other water-cooled devices so as to flow upwardly therein, thus maintaining a supply of water in each water chamber under atmospheric pressure. Moreover, each circulating line is preferably provided with a break and a gravity return system, similar to that shown in Figure 31, to prevent siphoning of the water from the chambers to be cooled.

The header pipe shown in Figures 46–48, designed for use with the apparatus of Figure 4, is made from a standard four inch pipe, approximately nine feet, nine inches in length and the trough is of corresponding length. The entire assembly may be supported by the vertical I-beams 115, 115a.

As pointed out above, in case the furnace is to be shut down for replacement of parts or repairs, the strip handling devices in the line may, nevertheless, be used to clean the strip and coil it up into rolls which may then be annealed in a batch annealer. If such use is desired, the strip is led from the last roller 71 of the looper, over the roll 76 and then under the casing 155 and the rollers 168 positioned therebelow. The bolts securing the casing sections 171 and the section 171' may be removed to permit removal of either or both of those sections and the strip may then be trained about the rolls in the casing 170, from which point it may run through the cooling chutes as previously described. Of course, in such case, the cooling fans are not operated, since the strip is drawn through the chutes simply as a matter of convenience. If this procedure is not desired, the strip may be drawn under the entire apparatus, in the space between the longitudinally extending, parallel foundation I-beams 156a, 156b. In any case, the unreeling and cleaning devices shown in Figures 2 and 3 and the reeling devices of Figures 5 and 6 may be used independently of the annealing apparatus of Figures 1 and 4.

The driving motors for the reeling and unreeling devices and for the pinch rolls are supplied with current from a motor generator set 380, shown diagrammatically in Figures 4 and 5 to prevent wide fluctuations in the current delivered to the motors, which might otherwise result when unusually heavy demands on the main supply are made in other parts of the plant.

The speed of movement of the strip through the apparatus is controlled by the variable speed motors 69, 91', 94' driving the pinch rolls 68, 91, 94 and by the motor 104 which drives the reeling mandrel 102. Appropriate independent manual controls for the several motors are provided, so that the speed of all may be varied simultaneously or independently, and to enable certain of the pinch rolls to be stopped, independently of the others, when a new strip is to be welded to the trailing end of a previous one, and when a completed coil is to be removed from the mandrel and a new coil started.

The apparatus of Figure 4 is preferred over that shown in Figure 1, since it has a greater out-put capacity or tonnage. The speed of travel of the strip through this apparatus is substantially twice that given above in connection with the apparatus of Figure 1. The four heating chambers through which the strip passes permit all parts of the strip to be raised to the annealing temperature and maintained within the annealing temperature range for substantially the same length of time as in the first case, even though the strip is moving at a rate well above four hundred feet per minute. Likewise the greater number of positive cooling chutes make it possible to reduce the temperature of the rapidly moving strip to a point below the oxidizing temperature, before it is drawn out through the roll seal at the discharge end of the apparatus, in spite of the rapid travel of the strip.

The apparatus of Figure 4 preferably has an over-all height dimension somewhat over forty feet, a longitudinal dimension, between the vertical frame members 115, 115a of about thirty feet, and a width between those members of approximately seven feet. In view of this very substantial size, it is desirable to provide ladders, platforms, and walkways, to permit operators to gain access to various parts of the apparatus. To this end, ladders 390, 391, 392 are provided, leading between walkways or platforms 393, 394, and 395. Railings 396 surround the various platforms, as indicated in Figures 4 and 9.

Although the invention and a number of specific embodiments thereof have been described with considerable particularity in this specification, it must be understood that many modifications may be made and that the invention is not limited to the details of construction described above and shown in the accompanying drawings, but covers all changes, variations, combinations of elements and modifications coming within the scope of the appended claims and their equivalents.

We claim:

1. An apparatus for continuously annealing strip steel comprising a furnace and strip cooling means, said furnace comprising a platform, a furnace casing supported thereon, brickwork within the casing dividing the same into four vertical chambers, each having a slotted brickwork floor, a gas-tight seal carried by the platform below the slot in the floor of the first chamber for the introduction of the strip thereinto, rolls at the upper ends of the chambers for transferring the strip from the first to the second chamber and from the third to the last, a casing spaced below said platform communicating with the slots in the floor of the second and third chambers, a roll in said casing spaced below the last mentioned floors for guiding the strip therethrough, a second casing spaced below the floor of the fourth chamber and communicating with the slot therein, and roll means in the last mentioned casing for delivering the strip from the furnace to the cooling means.

2. A gas circulating and cooling unit for use with a cooling chute in a continuous strip steel annealing apparatus, comprising a casing adapted to be secured over an opening in the wall of the chute, means dividing the casing into an exhaust chamber and a delivery chamber, a fan in the casing for circulating gas from the chute through said chambers and back into the chute against the surface of the strip passing therethrough, and water cooled means in the casing in the path of movement of said gas and adapted to extract heat therefrom.

3. A gas circulating and cooling unit for use with a cooling chute in a continuous strip steel annealing apparatus, comprising a casing adapted to be secured over an opening in the wall of the chute, a frame in the casing, a hood carried by the frame and dividing the casing into an exhaust chamber and a delivery chamber, a fan in the casing for circulating gas from the chute through said chambers and back into the chute against the surface of the strip passing therethrough, and a water cooled radiator carried by the frame and disposed in the delivery chamber between the fan and said strip, to extract heat from the gas before it is projected by the fan upon the strip.

4. In an apparatus for continuously annealing strip steel comprising a furnace and a plurality of cooling sections provided with water cooled elements, means for circulating cooling water through said elements, said means comprising a header, a waste water return trough adjacent the header and parallel thereto, a series of conduits leading from the header to the individual elements to be cooled, and a corresponding series of return water conduits debouching into said trough, each return water conduit being positioned in alignment with the corresponding header conduit, whereby the circulation of water through the individual conduits to the elements may be ascertained by visual inspection of the flow of water from the corresponding return water conduits into the trough.

5. In a continuous annealing apparatus having a plurality of vertical cooling chutes and fan units associated therewith for circulating a gaseous medium therein, said units being arranged in horizontally aligned groups, means for driving said fans, said means comprising a shaft journalled for rotation along one side of the chutes at an elevation between two groups of fans, power transmission means extending upwardly and downwardly from the shaft to the fans in the adjacent groups, and means for rotating the shaft.

6. In a continuous annealing apparatus having a plurality of cooling chutes, enclosed fan casings associated therewith, and fans in the casings for circulating a gaseous medium in the chutes, means for driving said fans, said means comprising stub shafts projecting outwardly through the casings, a drive shaft disposed to one side of the chutes, a plurality of power transmission devices connecting the drive shaft to a plurality of said stub shafts, and means for rotating the drive shaft.

7. In a continuous annealing apparatus having a plurality of vertical cooling chutes and fan units associated therewith for circulating a gaseous medium therein and arranged in six horizontally aligned groups, means for driving said fans, said means comprising three horizontal driving shafts disposed to the side of the chutes, each at an elevation between a pair of groups of fans, means connecting the driving shafts to the fans in the units immediately thereabove and therebelow, and means for rotating the shafts.

8. In a continuous annealing apparatus having a plurality of vertical cooling chutes and sprocket-driven fan units associated therewith for circulating a gaseous medium therein and arranged in horizontally aligned groups, means for rotating said sprockets, said means comprising a drive shaft disposed to one side of the chutes at an elevation between two groups of fan units, a plurality of sprockets on the shaft aligned with the sprockets of the units, chains trained about the sprockets on the drive shaft and inclined upwardly and downwardly, respectively, and trained about the sprockets of the units immediately thereabove and therebelow, and means for rotating the drive shaft.

WILLIAM B. COOPER.
EDWARD J. SEABOLD.

REFERENCES CITED

The following references are of record in the file of this patent:

UNITED STATES PATENTS

| Number | Name | Date |
|---|---|---|
| 1,633,121 | Minton | June 21, 1927 |
| 1,765,955 | Von Maltitz et al. | June 24, 1930 |
| 1,811,522 | Shover et al. | June 23, 1931 |
| 1,890,065 | Meehan | Dec. 6, 1932 |
| 1,930,837 | Hall | Oct. 17, 1933 |
| 1,953,118 | MacLeod | Apr. 3, 1934 |
| 1,991,339 | Ullman | Feb. 12, 1935 |
| 2,009,856 | Otis et al. | July 30, 1935 |
| 2,181,738 | Otis | Nov. 28, 1939 |
| 2,188,176 | Cornell | Jan. 23, 1940 |
| 2,218,354 | Keller | Oct. 15, 1940 |
| 2,278,136 | Otis et al. | Mar. 31, 1942 |